United States Patent [19]

Engdahl et al.

[11] Patent Number: 4,667,323

[45] Date of Patent: May 19, 1987

[54] INDUSTRIALIZED TOKEN PASSING NETWORK

[75] Inventors: Jonathan R. Engdahl, Bedford; Jeffery A. Hanneman, South Euclid; David C. Sweeton, Cleveland Heights, all of Ohio

[73] Assignee: Allen-Bradley Company, Inc., Milwaukee, Wis.

[21] Appl. No.: 771,834

[22] Filed: Sep. 3, 1985

[51] Int. Cl.[4] ............................................. H04J 3/02
[52] U.S. Cl. .................................. 370/85; 340/825.52
[58] Field of Search ............................. 370/89, 85, 86; 340/825.5, 825.52

[56] References Cited

U.S. PATENT DOCUMENTS

| | | | |
|---|---|---|---|
| 4,491,946 | 1/1985 | Kryskow, Jr. et al. | 370/89 |
| 4,506,360 | 3/1985 | Kryskow, Jr. et al. | 370/89 |
| 4,556,974 | 12/1985 | Kozlik | 370/89 |
| 4,583,088 | 4/1986 | Bux et al. | 370/86 |
| 4,593,280 | 6/1986 | Grow | 370/86 |
| 4,602,365 | 7/1986 | White et al. | 370/89 |

OTHER PUBLICATIONS

"Draft Standard Proway-Lan", Instrument Society of America, Jan. 1984.
"IEEE Project 802 Local Area Network Standards" IEEE Standard 802.4—1984 Token-Passing Bus Access Method and Physical Layer Specifications—The Institute of Electrical and Electronic Engineers, Inc. Jul., 1984.

Primary Examiner—Douglas W. Olms
Assistant Examiner—Frank M. Scutch, III
Attorney, Agent, or Firm—Barry E. Sammons

[57] ABSTRACT

A communications network is comprised of two or more stations which share mastership of the network by passing a token between them. While a station holds the token it may send low or high priority messages. It may also inform other stations of its intent to exit the network and it may solicit for new stations wanting to enter the network. The token is passed from station-to-station in accordance with a predetermined time schedule which insures each station fair access to the network while insuring that messages are conveyed between stations within a predetermined worst case time delay.

17 Claims, 17 Drawing Figures

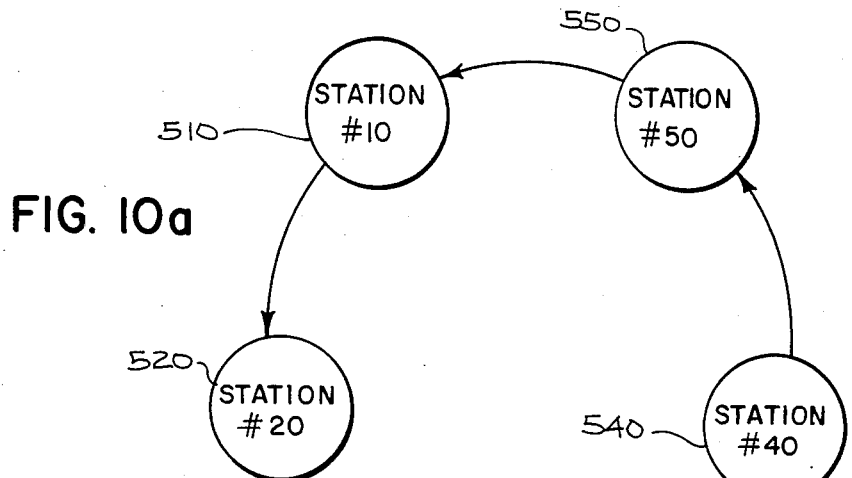
FIG. 10a
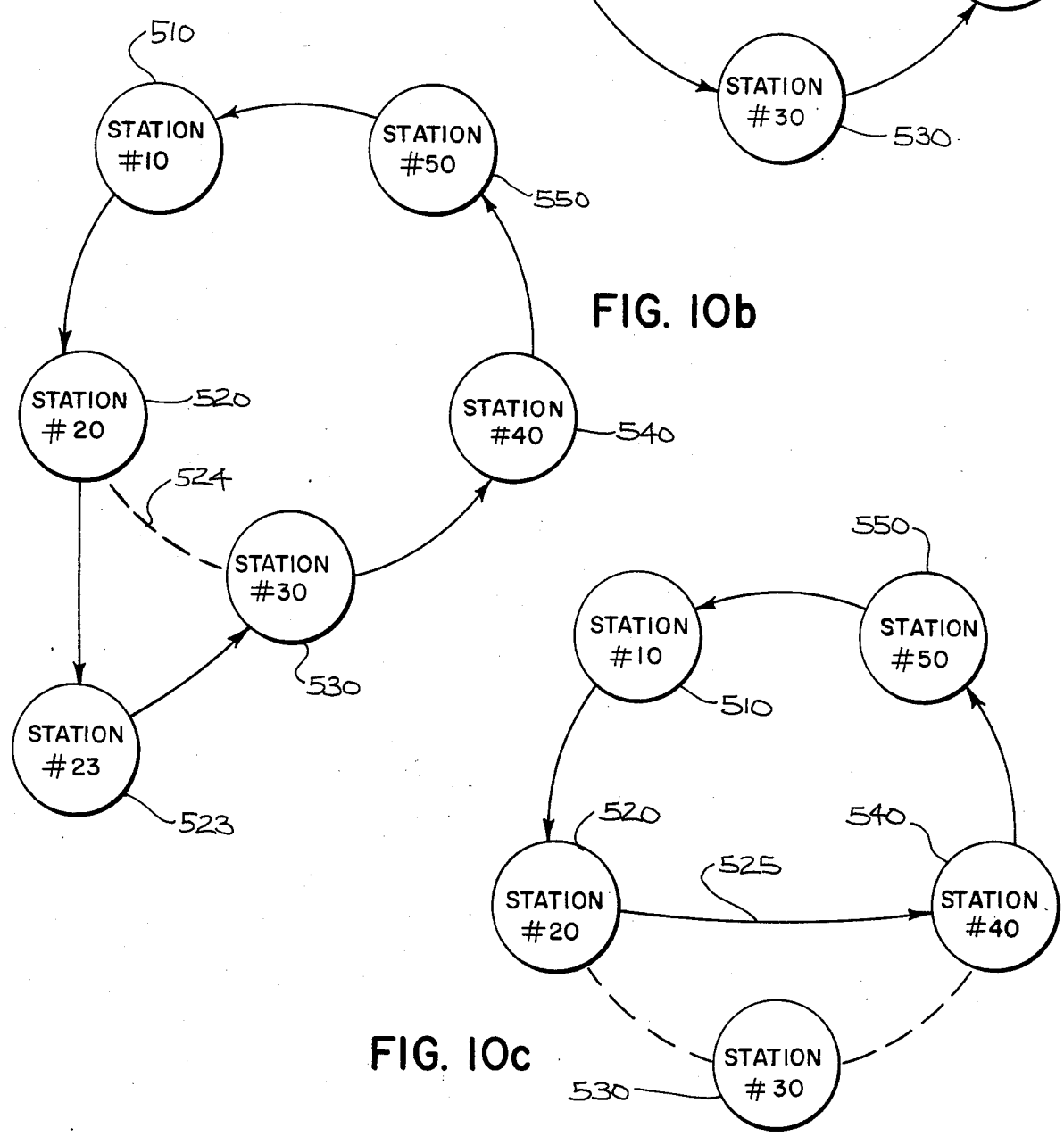
FIG. 10b
FIG. 10c

INDUSTRIALIZED TOKEN PASSING NETWORK

BACKGROUND OF THE INVENTION

The field of the invention is industrial control systems such as process controls, numerical controls, and programmable controllers, and particularly, to local area networks for connecting such controls together.

Local area networks are comprised of two or more nodes, or stations, which are linked together by a communications media. The communications media may take a number of forms, including coaxial cable, fiber optics or twisted wire pairs. The topology of the links between stations may also take a number of forms, including star, multidrop or ring configurations.

Regardless of the media used or the topology of the network, a control scheme is required to provide an orderly transfer of information from one station to another on the network. The most primitive schemes employ a master station which is responsible for controlling the operation of the network. The master may "poll" each slave station on the network for information to be delivered to other stations, or it may enable a polled station to transmit its message directly to other stations. Such networks are not appropriate for industrial applications because the entire network is brought down if a malfunction should occur in the master station.

Another solution is to employ a carrier sense multiple access (CSMA) scheme such as that defined by the Ethernet standards. In CSMA networks each station waits for the network to go silent, and if it has a message to send, it takes control of the network and begins transmission. A mechanism must be provided to detect "collisions" when two or more stations transmit messages at the same time, and for contending with those stations to determine which has priority. While CSMA networks are appropriate for office and commercial applications, they are not appropriate for industrial networks which convey information required by "real time" control systems. Other, more "deterministic" network control schemes are required for industrial networks.

Other, more deterministic network control schemes include time slot reservation, slotted rings, register insertion rings and token passing networks. With a token passing scheme, a token in the form of a distinctive bit pattern is passed between stations on the network. While a station has the token, it can transmit messages to other stations or command other stations to transmit messages. While token passing schemes are simple in concept, they are complicated to implement due to the problem of lost tokens and duplicate tokens. These problems are more severe in the industrial environment where power may be lost, where stations may be added or removed from the network, or where malfunctions may occur in a station or the media connecting the stations.

SUMMARY OF THE INVENTION

The present invention relates to a local area network for industrial use in which a token passing scheme is employed for network control. The present invention employs a plurality of stations which are connected logically in a ring by the passing of a master token between the stations. The station possessing the master token sends messages to other stations in the ring and these include a solicit message which seeks a response from new stations which want to be added to the logical ring and a graceful exit message which indicates to other stations that the token holder intends to withdraw from the logical ring. The token holder may keep the master token for a limited period of time, during which it may send either low priority or high priority messages to other stations.

One aspect of the present invention is to limit the time each station may hold the master token such that it is passed around the ring within a predetermined schedule. This is accomplished by maintaining an EXCESS time which is carried by the master token as it moves around the logical ring and which indicates how far ahead of schedule the master token is at any point. Token hold time is limited by this EXCESS time.

Another aspect of the present invention is the assurance that a portion of the network bandwidth is always available for low priority messages. This is accomplished by limiting the time available for sending high priority messages while the token is held by each station. EXCESS time is always available after the sending of high priority messages and this may be accumulated until sufficient time is available to send a low priority message. To fairly distribute the time available to send low priority messages, each station maintains a RESERVE time which is an accumulation of the time that station has contributed to the EXCESS time carried by the master token. The station cannot send a low priority message unless it has accumulated sufficient RESERVE time to do so.

A general object of the invention is to provide a communication network for use in an industrial environment. By maintaining the master token within a predetermined schedule, the worst case time delays associated with sending a message from one station to another can be calculated. This deterministic protocol is necessary when operating real time control systems and is in sharp contrast to protocols commonly employed in commercial networks.

Another object of the invention is to fairly distribute the available network bandwidth between the stations on the network and between high priority and low priority traffic.

Yet another object of the invention is to enable stations to enter the logical ring or exit the logical ring with minimal disturbance or complication. This is accomplished by the sending of a solicit message or a graceful exit message when the station has the master token. The graceful exit message informs the predecessor on the logical ring that it should pass the master token to another station next time around the logical ring. The solicit successor message is sent to new stations located between the token holder and its successor station. The new station responds and the sending station is informed that it is to pass the token to the new station on the next revolution of the master token around the logical ring.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 10a, 10b and 10c are schematic representations of the logical ring formed by the network of FIG. 1 showing the addition and removal of a station from the logical ring;

FIG. 11 is a flow chart of the program for receiving and processing messages on the network which forms part of the program illustrated in FIG. 8;

FIG. 11b is a flow chart of the program for processing solicit messages which forms part of the program of FIG. 11a;

FIG. 11c is a flow chart of the program for processing graceful exit messages which forms part of the program of FIG. 11a;

FIG. 12b is a flow chart of the program for determining the next function to be performed, which forms part of the program of FIG. 12a.

GENERAL DESCRIPTION OF THE INVENTION

Figure 1:
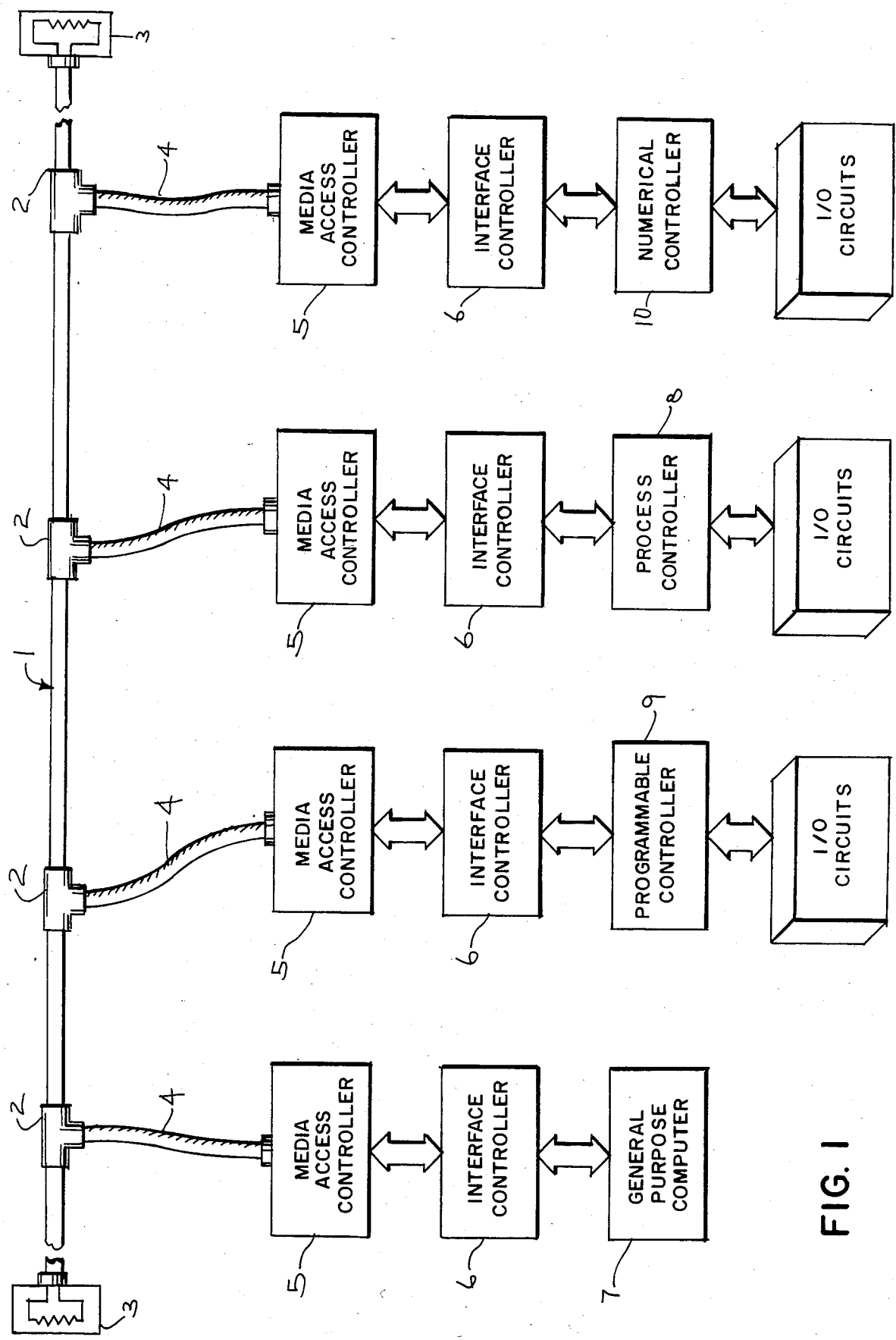
FIG. 1 is a pictoral view of the communications network of the present invention.

The local area network of the present invention is comprised of a set of stations which configure themselves into a logical ring so that a token may be passed around the ring from station to station. Only the station currently holding the token may transmit a message on the network. This logical ring configuration is implemented by assigning each station a unique station number, or address, and passing the token in ascending address order. These same station addresses are employed to identify the source and destination of messages transmitted on the network. It should be apparent to those skilled in the art that this logical ring configuration is independent of the particular media (wire, cable, fiber optics, etc.) or network topology (ring, trunk, star, etc.).

Referring particularly to FIG. 10a, an exemplary logical ring containing five stations 510, 520, 530, 540 and 550 is formed having the respective station numbers 10, 20, 30, 40 and 50. At any moment in time, one of these stations is allowed to send a message on the network to the other stations and this sending station is said to possess the "token". If the message sent requires an immediate response from the destination, the destination station is given the opportunity to respond. The right to send then passes back to the station holding the token. The token holder must follow certain rules that regulate the amount of time that it may hold the token. When this time expires, or when the station has nothing further to send, the token holder may perform some network maintenance operations. When these are complete, the token holder passes the token to the next, or "successor", station in the logical ring. From the time the station passes the token until it again receives the token, the station will receive messages from other stations on the network who possess the token.

The token is passed to a successor station with a token message that includes the station number of the successor station that is to receive it. This, of course, presumes that each station stores the station number of its successor. For example, in the network of FIG. 10a, station 510 stores a successor address=20, the station 520 stores a successor address=30, and so on around the ring. The resulting circulation of the token is smooth and predictable as long as all stations remain in the logical ring and no new stations want in the ring.

FIG. 10b illustrates the situation in which another station 523 is added to the ring. As indicated by the dashed line 524, the token is no longer passed from station 520 to 530, but is instead passed through the new station 523. One aspect of the present invention is the manner in which the new station 523 is added to the logical ring.

More specifically, the present invention employs a second virtual token, called a "solicit token," which is passed around the logical ring. When a station holds the solicit token, it may send a SOLICIT message as part of its network maintenance operations. Such a message includes the address of its successor station, and it is directed to a single station number located numerically between itself and its successor station. If a new station wants entry to the logical ring between the token holder and its successor, the new station responds to one of these SOLICIT messages. The new station responds with a SET SUCCESSOR message which informs the token holder of the new ring member. For example, station 520 sends a series of SOLICIT messages with destination addresses between 20 and the address of its successor station #30. The new station 523 has an address between twenty and thirty and so it responds to one of these SOLICIT messages with the SET SUCCESSOR message. As a result, the successor for station 520 is changed to twenty-three, the successor for new station 523 is set to thirty, and the token is passed to the new station 523 in the normal fashion. A smooth transition is thus achieved.

The solicit token is passed around the logical ring at a much slower rate than the "master" token. In the preferred embodiment there is no overt act of passing the solicit token. Instead, each station is programmed such that if it does not hear a SOLICIT message on the network during one complete revolution of the master token, it assumes it has the solicit token and should send the SOLICIT message itself. As a result, a SOLICIT message is sent once for each complete revolution of the master token and it is effectively passed to the next station in the ring after a SOLICIT message has been sent to each station number therebetween.

Referring particularly to FIG. 10c, the logical ring may also be changed when a station becomes inactive.

For example, if the station 530 becomes inactive, the token should be passed directly from station 520 to station 540 as indicated by arrow 525. A graceful transition to the smaller logical ring is accomplished with the present invention in which the withdrawing station 530 notifies the predecessor station 520 of its intention. Such notification is in the form of a GRACEFUL EXIT message which is sent to the predecessor station when the withdrawing station has the master token. This message alters the successor address in the station 520, for example, to "forty" in place of its previous value of "thirty". Thus, during the next revolution of the master token, the station 520 will pass the master token to the station 540 rather than station 530. The station is, therefore, gracefully removed from the logical ring.

DESCRIPTION OF THE PREFERRED EMBODIMENT

The communications network includes a cabling system which conveys information in the form of electrical signals. The cabling system employs 75 ohm flexible coaxial cable with double shield (foil/braid) to maintain high noise immunity. BNC connectors are employed to connect the cable segments together.

Referring particularly to FIG. 1 the cabling system includes a trunk cable 1 which is comprised of segments of RG-11 type cable connected together by taps 2. The trunk cable 1 has an attenuation of 3.3 db per thousand feet at the higher signal frequency of 6.25 MHz, and the trunk cable 1 may be up to 9000 feet in length without the need for repeaters. The trunk cable 1 is terminated at each end with a 75 ohm resistor 3.

Each tap 2 provides a means for connecting a node, or station, to the trunk cable 1 through a dropline cable 4. The dropline cables 4 also employ a 75 ohm coaxial cable, and each has a length of approximately twenty four inches. Because of the short length, a more flexible and easy to install cable may be used for the dropline cables 4.

Referring still to FIG. 1, each station on the network includes a media access controller 5 and an interface controller 6. As will be described in more detail below, the media access controller 5 is identical for each station, and its primary function is to implement the data link layer protocol. The media access controller 5 thus controls the right to transmit information on the network, insuring that only one station is transmitting at any time, and that each station has a fair share of the transmission time at regular intervals. It guarantees the integrity of the information which is transferred between stations, and it insures that information is not lost or duplicated. Physically, the media access controller 5 is located on a separate printed circuit board which connects to the dropline cable 4 through a BNC connector.

The media access controller 5 also provides a standard interface to its associated interface controller 6. The interface controller 6 functions to electrically connect the media access controller 5 to a specific machine, and it implements the higher protocol layers for communications between these machines, as defined in the Reference Model for Open Systems Interconnection by the International Standards Organization (ISO). Physically, the interface controller 6 is located on a printed circuit board which electrically connects to a dual-ported memory on its associated media access controller 5. The interface controller 6 may provide a standard connection, or port, to a commercially available machine, such as a general purpose computer 7, or process controller 8. On the other hand, the interface controller 6 may be constructed to plug directly into the back plane of a programmable controller 9, such as that disclosed in U.S. Pat. No. 4,442,504, or a numerical controller 10, such as that disclosed in U.S. Pat. No. 4,228,495. As will be described in more detail below, the interface controller 6 receives message data from the media access controller 5, converts the data into a form which is recognized by its associated machine 7–10, and conveys the data to the machine.

Hardware Description

Figure 2:
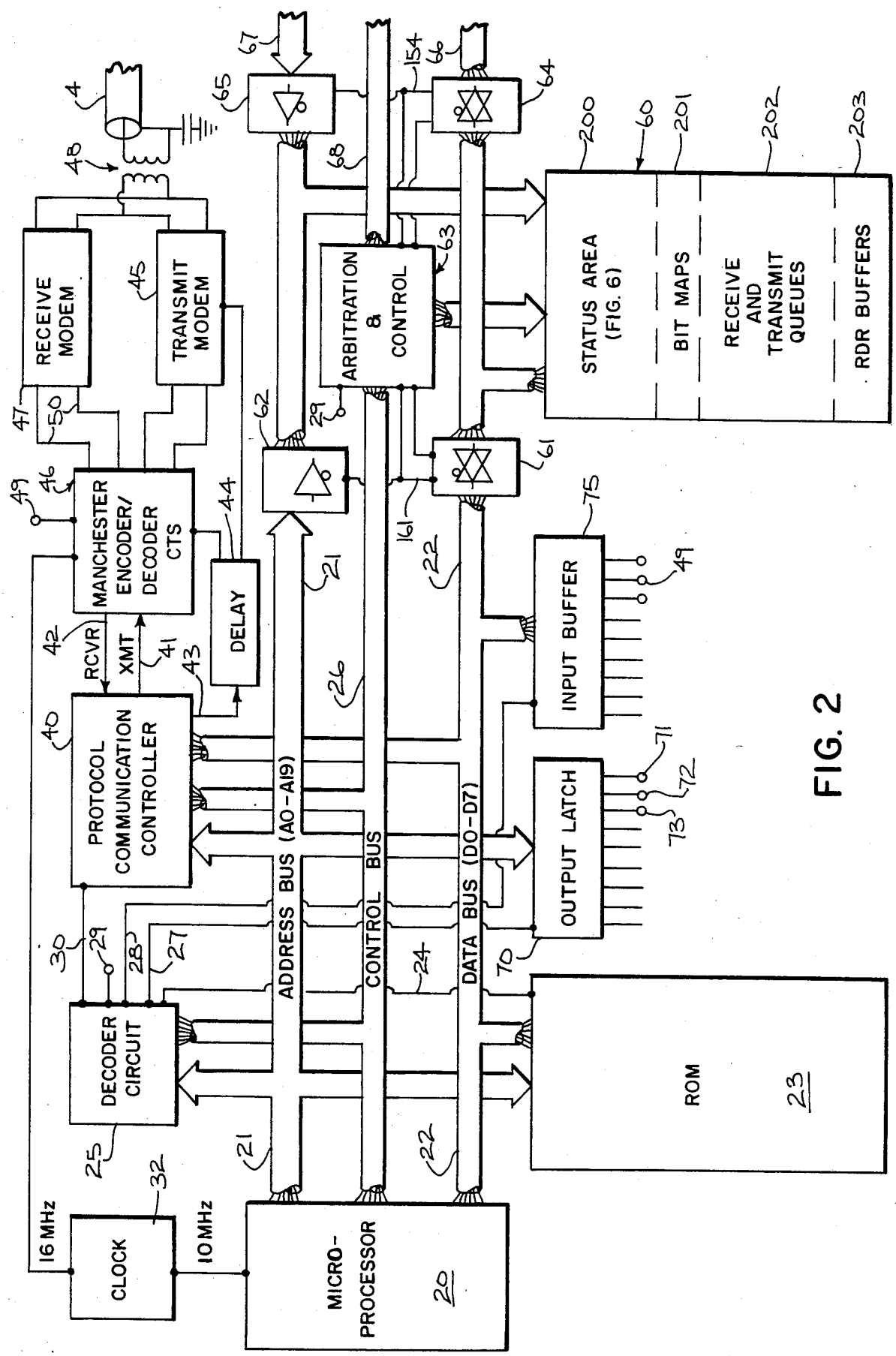
FIG. 2 is an electrical schematic diagram of a media access controller which forms part of the network of FIG. 1.

Referring particularly to FIG. 2, the media access controller 5 is structured about a microprocessor 20 which drives a 20-bit address bus 21 and an 8-bit data bus 22. The microprocessor 20 is operated by a 10 MHz clock 32 and it produces control signals on lines which are collectively referred to as a control bus 26. The microprocessor 20 executes machine language programs which are stored in an ROM 23 to carry out the functions of the media access controller 5. Data is coupled between elements which are connected to the buses 21 and 22 when the microprocessor 20 executes a read or write cycle. A machine language program instruction is fetched from the ROM during a read cycle, for example, when the ROM 23 is enabled through a control line 24 and the address of the instruction is produced on the address bus 21 by a program counter (not shown) within the microprocessor 20.

The ROM 23 as well as the other addressable elements in the media access controller 5 are enabled by control lines driven by a decoder circuit 25. The decoder circuit 25 is responsive to the address produced on the address bus 21 and to signals produced on the control bus 26 to generate an enable signal on one of six control lines 24, 27–30. The address spaces occupied by the addressable elements operated by these control lines are indicated in Table A.

TABLE A

| Address (Hexadecimal) | Element |
|---|---|
| 00000 - 07FFF | ROM 23 |
| 08000 - 0801F | Protocol Communication Controller |
| 08020 - 08027 | Input Buffer |
| 08040 - 08047 | Output Latch |
| 0C000 - 0DFFF | Arbitration & Control |

A protocol communication controller (PCC) 40 connects to the buses 21,22 and 26, and is enabled by control line 30 driven by the decoder circuit 25. The PCC 40 is a commercially available integrated circuit which performs a number of functions associated with the receipt or transmission of messages through the network. When enabled during a write cycle, message data may be written to an 8-byte transmit buffer, or data may be written to a number of internal registers to configure the PCC 40. During a read cycle, message data may be read from an 8-byte receive buffer, or status information may be read from any of a number of internal status registers.

The PCC 40 functions to transmit on an XMT line 41 a serial stream of bits corresponding to the data stored in its internal transmit buffer. The PCC 40 is also configured to insert a flag byte at the beginning and end of each transmitted message, and to calculate and transmit a CRC byte at the end of each message. The PCC 40 also functions to receive a serial stream of bits on an RCVR line 42 and to deposit the message data in its internal receive buffer. The PCC 40 also removes flag bytes, and it performs CRC checks on received messages.

When a message is to be transmitted, the PCC 40 generates a request-to-send signal on a control line 43 to a delay circuit 44. This signal promptly enables a transmit modem 45 which begins to generate its carrier signal, and eight microseconds later, a Manchester encoder/decoder 46 is enabled to begin modulating the carrier signal. The Manchester encoder/decoder 46 is a commercially available integrated circuit which receives the serial bit stream from the XMT line 41 and outputs a corresponding Manchester code to the transmit modem 45. As is well known in the art, the Manchester encoded serial data has no dc voltage or current component and it has a higher degree of noise immunity than the more conventional nonreturn-to-zero code. The transmit modem 45 is also a commercially available integrated circuit which transmits serial data as a periodic high frequency, asynchronous signal whose frequency depends on whether the serial data is a logic high or low. The transmit modem 45 generates a 6.25 MHz signal for a logic high and a 3.75 MHz signal for a logic low. This high frequency output signal is applied to the dropline 4 through an isolation transformer 48.

Referring still to FIG. 2, when a signal is produced on the network by another station, it is coupled through the transformer 48 to the input of a receive modem 47. The receive modem 47 is a commercially available integrated circuit which converts a 6.25 MHz carrier into a logic high voltage level and a 3.75 MHz carrier into a logic low voltage. The resulting stream of Manchester encoded data is applied to the Manchester encoder/decoder 46 through lines 50. The Manchester decoder 46 produces a valid signal indication on a control line 49 and it produces a serial bit stream which is applied to the PCC 40 through the RCVR line 42.

Messages are thus transmitted on the network as FSK encoded signals by writing the message data to the transmit buffer in the PCC 40. FSK encoded messages on the network are received, decoded and applied to the receive buffer in the PCC 40. This message data is read from the receive buffer and is processed, as will be described in more detail below.

Message data is conveyed between the media access controller 5 and its associated interface controller 6 through a dual ported RAM 60. The RAM 60 couples to the data bus 22 through a set of bi-directional data gates 61 and to the address bus 21 through a set of address gates 62. The gates 61 and 62 are tri-state gates which are operated by an arbitration and control circuit 63 that in turn is enabled by the decoder circuit 25 through control line 29. The arbitration and control circuit 63 operates in response to signals on the control bus 26 or to signals on a corresponding set of control lines 68 from the interface controller 6.

As will be described in more detail below, when the dual ported RAM 60 is addressed by the microprocessor 20 the arbitration and control circuit 63 is enabled and a read or write cycle is performed on the addressed memory location. If the dual-ported RAM is being accessed through its other port, however, the microprocessor 20 is held in a wait state until access can be granted. The other port is provided by a second set of bi-directional data gates 64 and a second set of address gates 65. These couple the dual-ported RAM 60 to a data bus 66 and an address bus 67 in the interface controller 6. The arbitration and control circuit 63 also controls these gates and grants the interface controller 6 access to the dual-ported RAM 60.

Referring still to FIG. 2, the media access controller 5 operates a number of single-bit devices and control lines through an output latch 70. The latch 70 is enabled by the decoder circuit 25 through control line 27 during a write cycle, and a single bit is written thereto and latched in one of sixteen separately addressable locations. The output latch 70 drives a number of control lines which connect to the interface controller 6, including an INT HOST line 71, a MACREADY line 72 and a MAC FAULT line 73. As will be explained in more detail below, the lines 72 and 73 are employed during power-up to inform the interface controller 6 of the status of the media access controller 5, and the line 71 is employed to inform the interface controller 6 that message data is available for it in the dual-ported RAM 60.

An input buffer 75 connects to the data bus 22 and is enabled by the decoder circuit 25 through control line 28. Single-bit data is thus input to the microprocessor 20 from a number of sources such as the encoder/decoder 46.

Figure 3:
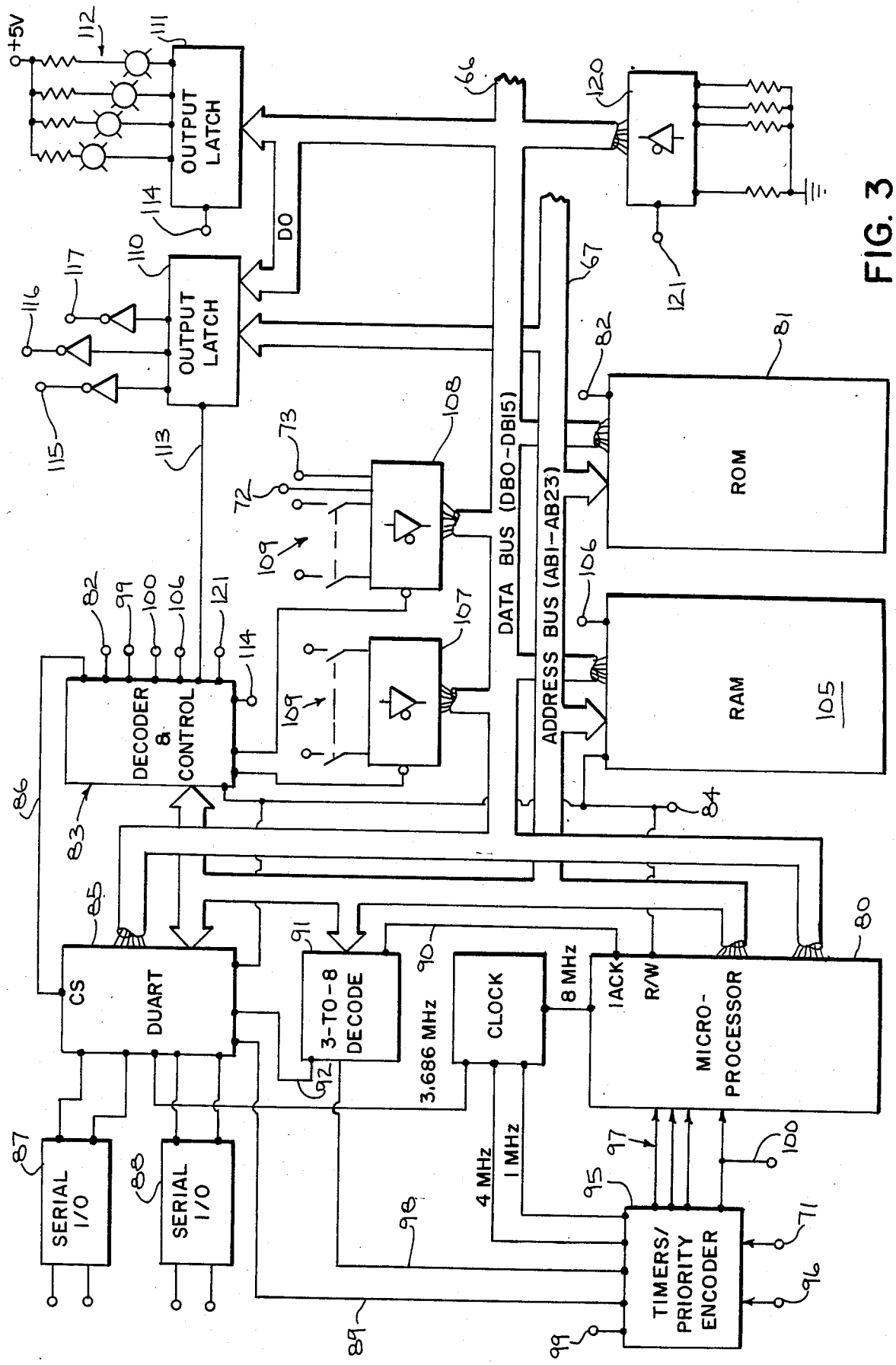
FIG. 3 is an electrical schematic diagram of an interface controller which forms part of the network of FIG. 1.

Referring particularly to FIGS. 2 and 3, the interface controller 6 is also structured about a microprocessor 80 which drives a 16-bit data bus 66 and a 23-lead address bus 67. These buses 66 and 67 couple to the dual-ported RAM 60 as described above, and the microprocessor 80 may read data from the RAM 60 or write data thereto after obtaining access through the arbitration and control circuit 63.

Referring particularly to FIG. 3, the microprocessor 80 is driven by a clock and it operates in response to machine language programs stored in a read only memory (ROM) 81 which connects to the buses 66 and 67. The ROM 81 is enabled during a read cycle through a control line 82 that is driven by a decoder and control circuit 83. The decoder and control circuit 83 connects to the address bus 67 and to a number of control lines driven by the microprocessor 80, including a read/write control line 84. The decoder and control circuit 83 is responsive to the address code on the bus 67 to enable an "addressed" element of the interface controller 6. The address spaces occupied by these addressable elements are indicated in Table B.

TABLE B

| Address (Hexadecimal) | Element |
|---|---|
| 000000 - 07FFFF | ROM 81 |
| 080000 - 0FFFFF | RAM |
| FF9F00 - FF9F3F | Output Latches |
| FF9F40 - FF9F7F | DUART 85 |
| FF9F80 - FF9FBF | Timers/Priority Encoder |
| FF9FC0 - FF9FDF | Input Gates |
| FFC00D - FFFFFF | Dual-Port RAM 60 |

One of the addressable elements is a dual universal asynchronous receiver/transmitter (DUART) 85, which connects to the buses 66 and 67, and which is enabled through control line 86. The DUART 85 is a commercially available integrated circuit which transmits and receives serial data at either of two serial I/O ports 87 and 88. A data word may be written to an output register for either serial port 87 or 88 within the DUART 85, and that data word is then shifted out the indicated port automatically. Conversely, when serial data is received at one of the ports 87 or 88, the DUART 85 interrupts the microprocessor 80 through an interrupt request line 89, and the microprocessor 80 reads the received data word from the DUART 85 as part of its interrupt service routine. The microprocessor 80 also produces a control signal on an interrupt acknowledge line 90 along with a 3-bit code which are both applied to a 3-line-to-8-line decoder circuit 91. The interrupt request by the DUART 85 is thus acknowledged through a DACK control line 92 which is driven by the decoder 91.

The DUART 85 is configured during power-up to implement an RS-232 standard protocol at the serial I/O port 87 and to implement an RS-422 standard protocol at the serial I/O port 88. Signals up to 19.2 K band are supported at either port 87 or 88, and it is the general objective of this preferred embodiment of the interface controller 6 to provide standard serial ports to a wide variety of commercially available general purpose computers.

The microprocessor 80 responds to a number of interrupt requests which are priortized by a timers/priority encoder circuit 95. In addition to receiving the interrupt requests from the DUART 85. The priority encoder 95 receives a power failure interrupt from the supply (not shown) through a line 96 and an interrupt request from the media access controller 5 through control line 71. The priority encoder 95 responds to these and a number of interrupts generated by internal timers by producing a 3-bit interrupt vector on lines 97 which indicate to the microprocessor 80 the highest priority interrupt request. When an interrupt request is acknowledged by the microprocessor 80, this is indicated through a IACK control line 98 which is driven by the 3-to-8 decoder 91.

Although not shown in FIG. 3, the timers/priority encoder 95 is connected to the address bus 67 and the data bus 66. It is enabled by the decoder and control circuit 83 through a control line 99 when data is written to or read from any of its internal registers (not shown). This is done primarily during power-up when the system is being initialized, although the internal timers may also be read to provide a real time clock capability.

When the timer/priority encoder 95 is addressed, it produces an acknowledge signal on a DTACK line 100 which indicates to the microprocessor 80 that a proper device has been addressed and that the read or write cycle can be completed. This same line 100 is also driven by other system elements when they are addressed. During each read or write cycle, the microprocessor 80 produces an address on the bus 67 and awaits the receipt of a DTACK signal from the addressed element. The microprocessor 80 will thus wait for asynchronous system elements such as the arbitration and control circuit 63 before completing the read or write cycle.

The interface controller 6 includes a random access memory (RAM) 105 which connects to the buses 66 and 67, the read/write control line 84, and an enable line 106. As will be described in more detail below, the RAM 105 stores a number of data structures which relate to the conversion of messages received through one of the serial ports 87 or 88 into a form which may be passed on to the media access controller 5. The microprocessor 80 is programmed to provide higher protocol layer services such as: application layer; presentation layer; session layer; transport layer; and network layer services. These services require large amounts of random access memory.

A number of single-bit input and output elements are coupled to the buses 66 and 67. These include a two sets of input gates 107 and 108 which connect to control lines 72 and 73 from the media access controller 5 and to single pole switches 109 which are manually set to configure the station for any of a wide variety of applications. The input gates 107 and 108 are tri-state gates which may be addressed and enabled by the decoder and control circuit 83 to apply their inputs to the data bus 66 during a read cycle. Conversely, two sets of latches 110 and 111 connect to the data bus 66 and drive a number of control lines and indicator lights 112. The latches 110 and 111 are enabled through control lines 113 and 114 to latch the data on the bus 66 during a write cycle. The output latch 110 drives a HOST READY control line 115, a HOST FAULT line 116, and a SHUT DOWN line 117. The SHUT DOWN line 117 connects to the power supply indicator light (not shown) for both the media access controller 5 and the interface controller 6, and when enabled, the user is notified that the power supply may be turned off.

As indicated previously, the dual-ported RAM 60 in the media access controller 5 is organized with an 8-bit word length. The data bus 66 in the interface controller 6 is sixteen bits wide, and during a read or write operation with the dual ported RAM 60, eight of its leads are unused. Accordingly, a set of tri-state gates 120 are connected to these unused leads and are enable through a control line 121 whenever the dual ported RAM 60 is addressed. The inputs to the gates 120 are connected to circuit ground to pull the eight most significant data bus leads to a logic low voltage when data is read from the dual port RAM 60.

The interface controller 6 of the preferred embodiment is but one of many possible constructions. For example, an interface controller 6 for a programmable controller or numerical control system may replace the two serial ports and associated hardware with an interface to a backplane bus. Such a backplane bus may connect to the processor of the programmable controller or numerical control system, or to other circuits such as memory modules, I/O scanner modules or peripheral processor modules. For example, the interface controller 6 may be employed as the "communications network interface" in the programmable controller described in U.S. Pat. No. 4,442,504.

Figure 4:
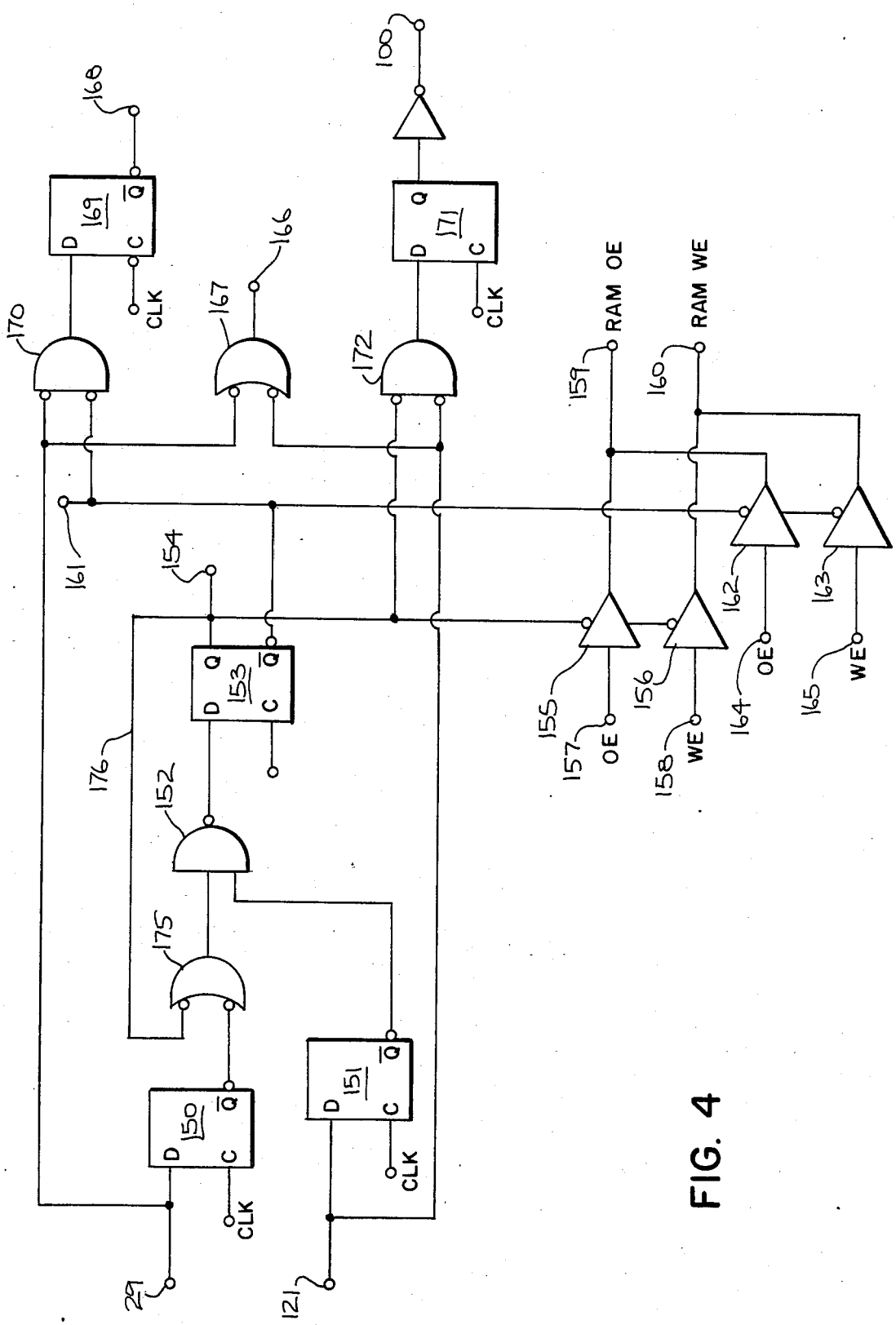
FIG. 4 is an electrical schematic diagram of an arbitration and control circuit which forms part of the media access controller of FIG. 2.

Referring particularly to FIGS. 2 and 4, the arbitration and control circuit 63 is comprised of discrete logic devices, including a pair of D-type flip-flops 150 and 151. The "D" inputs on these flip-flops 150 and 151 connect to the respective request control lines 29 and 121 eminating from the media access controller 5 and the interface circuit 6, respectively. Their $\overline{Q}$ outputs couple through a NAND gate 152 to the "D" input of a third D-type flip-flop 153, and this flip-flop 153 is either set or reset to indicate which requesting system has access to the dual-ported RAM 60.

The Q output of the flip-flop 153 drives the enable line 154 which allows connection of the interface controller buses to the dual ported RAM 60. It also enables a pair of tri-state gates 155 and 156 to couple the output enable (OE) and write enable (WE) control lines 157 and 158 from the interface controller 6 to the corresponding control lines 159 and 160 on the dual-ported RAM 60. Similarly, the $\overline{Q}$ output of the flip-flop 153 controls the enable line 161 which connects the media access controller buses to the dual-ported RAM 60. This same line also enables a pair of tri-state gates 162 and 163 to connect output enable line 164 and write enable line 165 from the media access controller 5 to the respective RAM control lines 159 and 160. A chip select lead 166 which enables the dual-ported RAM 60 is driven by an OR gate 167 when either the media access controller 5 or the interface controller 6 requests access through respective lines 29 or 121.

After the appropriate buses and control lines have been connected to the dual-ported RAM 60 a "DTACK" signal is sent to the appropriate microprocessor 20 or 80 to complete the read or write cycle. A DTACK control line 168 for the medial access controller's microprocessor 20 is driven by a flip-flop 169, which in turn is either set or reset by an AND gate 170. Similarly, the DTACK line 100 for the interface controller microprocessor 80 is driven by a flip-flop 171, which is set or reset by an AND gate 172. The AND gate 170 or 172 is enabled when both its inputs are driven low.

After the interface controller 6 has completed a read or write cycle to the dual-ported RAM 60, the arbitration and control circuit 63 switches back to give instant access to the media access controller 5 if requested. This is accomplished by an OR gate 175 which connects between the flip-flop 150 and the NAND gate 152. A line 176 connects the Q output of flip-flop 153 to this OR gate 175 and the flip-flop 153 is set to enable the media access controller access as soon as the access request from the interface controller 6 is removed from request line 121. As a result, when access is requested through line 29 by the media access controller 5, the flip-flop 153 is already set, and the AND gate 170 is immediately enabled to complete the read or write cycle without delay.

Description of the Data Structures

Referring particularly to FIG. 2, the dual port RAM 60 is employed to pass information between the media access controller 5 and the interface controller 6, and it is used as a work space by the microprocessor 20. The data stored in the RAM 60 may be divided into four general areas, or data structures: a status area 200; bit maps 201; receive and transmit queues 202; and RDR buffers 203. These data structures, as well as the structure of the messages which are communicated over the network will now be described.

Figure 5:
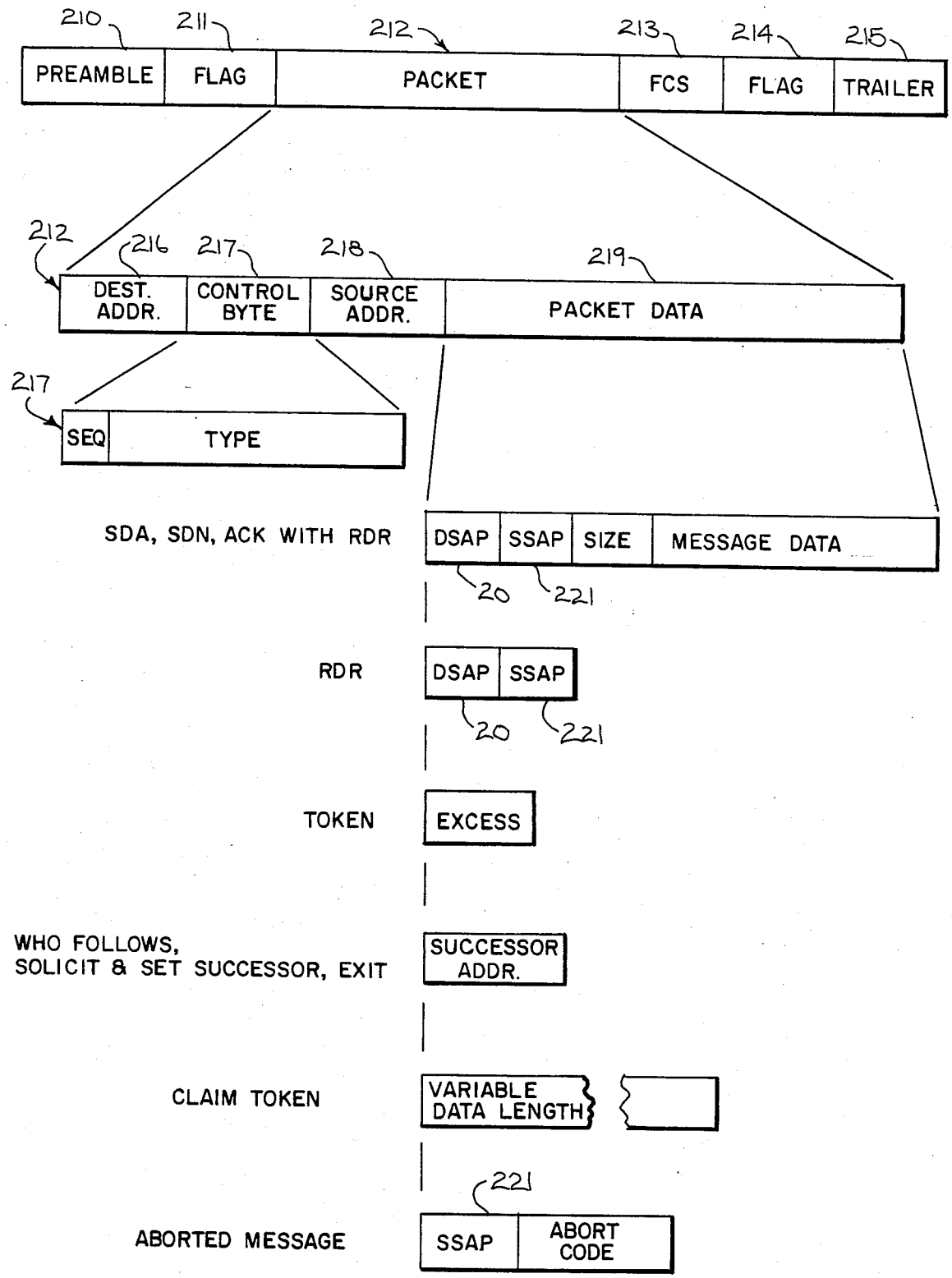
FIG. 5 is a schematic representation of the structure of the messages which are sent on the network of the present invention.

Referring first to FIG. 5, the messages which are conveyed over the network by the media access controllers 5 are comprised of a series of ones and zeros which implement a bit-oriented protocol. A complete message, or frame, includes a series of preamble bits 210, followed by flag bits 211, a packet 212, frame check sequence (FCS) bits 213, another set of flag bits 214 and a series of trailer bits 215. This frame resembles other well-known bit-oriented protocols such as ADCCP, HDLC and SDLC. The leading bits 210 and 211 and the trailing bits 213, 214 and 215 which encapsulate the packet 212 are produced by the protocol communications controller 40 (FIG. 2) as described in the data sheet (Document No. 68650N06) for the R68560, R68561 multi-protocol communications controller published in 1984 by Rockwell International.

Each packet 212 contained in a message includes four segments: a destination address 216; a control byte 217; a source address 218; and packet data. The destination address is one byte in length and it indicates the station number of the message destination. A station number of "255" indicates that the message is "broadcast" to all stations. Similarly, the source address byte 218 indicates the number of the station which originated the message. The control byte 217 includes seven bits which identify the nature, or "type", of message and a single bit (SEQ) which is employed as a toggle bit when a series of messages are transmitted in a specific sequence. There are twenty message types indicated by the control byte 217:

0=token message which is employed to pass the right to transmit on the network.
1=solicit successor message which is employed to locate a station which is to receive the token next.
2=set successor message which indicates to the receiving station the station to which it should pass the token.
3="who follows" message which is broadcast to all stations when the indicated successor fails to take the token.
4=graceful exit message which indicates to a station's predecessor that it is withdrawing from the network.
5=Request data with reply (RDR) message which requests the receiving station to send message data in its reply message.
7=claim token message used to establish ownership of the master token when it has become lost.
8=Priority send data with acknowledge (SDA) message, which delivers data to the destination address and solicits an acknowledge (ACK) message in response to confirm that the message was delivered properly.
9=Priority SDA message.
10=SDA message having 0 to 255 data bytes.
11=SDA message having 256 to 272 data bytes.
12=Send data with no acknowledge (SDN) message having 0 to 255 data bytes.
13=SDN message having 256 to 272 data bytes.
14=Acknowledge (ACK) message with no packet data.
16=ACK message with 0 to 255 bytes of RDR data.
17=No acknowledge (NAK) message indicating that the station does not have sufficient memory space to receive the message.
18=NAK message indicating the station is offline.
19=NAK message indicating that the link service access point is inactive.
20=NAK message indicating that the format of the packet data is improper.

Referring again to FIG. 5, the contents of the packets 212 will be determined by its type. All packets 212, except types 3, 14, 17, 18, 19 and 20 include packet data 219. The nature of this packet data 219 is determined by the message type, and it can range from a single byte to nearly three hundred bytes in length. Many of the message types include actual message data 222 and a size byte 223 which indicates the length of the message data 222. The message data 222 will usually contain specific information that is formatted to implement the higher layer protocols of the ISO standard.

Many of these messages include a destination service access point (DSAP) byte 220 or a source service access point (SSAP) byte 221. Each station on the network can perform more than one communications function for the controller or device with which it connects. For example, one function, or "service", may be to deliver messages between the serial I/O port 87 on the interface controller 6 (FIG. 3) and programmable controllers connected to other stations on the network, and a second service may be to deliver messages between the second serial I/O port 88 and numerical control systems connected to other stations on the network. The DSAP and SSAP bytes therefore identify which service at a station originated or is to receive a particular message. Up to 256 separate services may be supported at each station.

Figure 6:
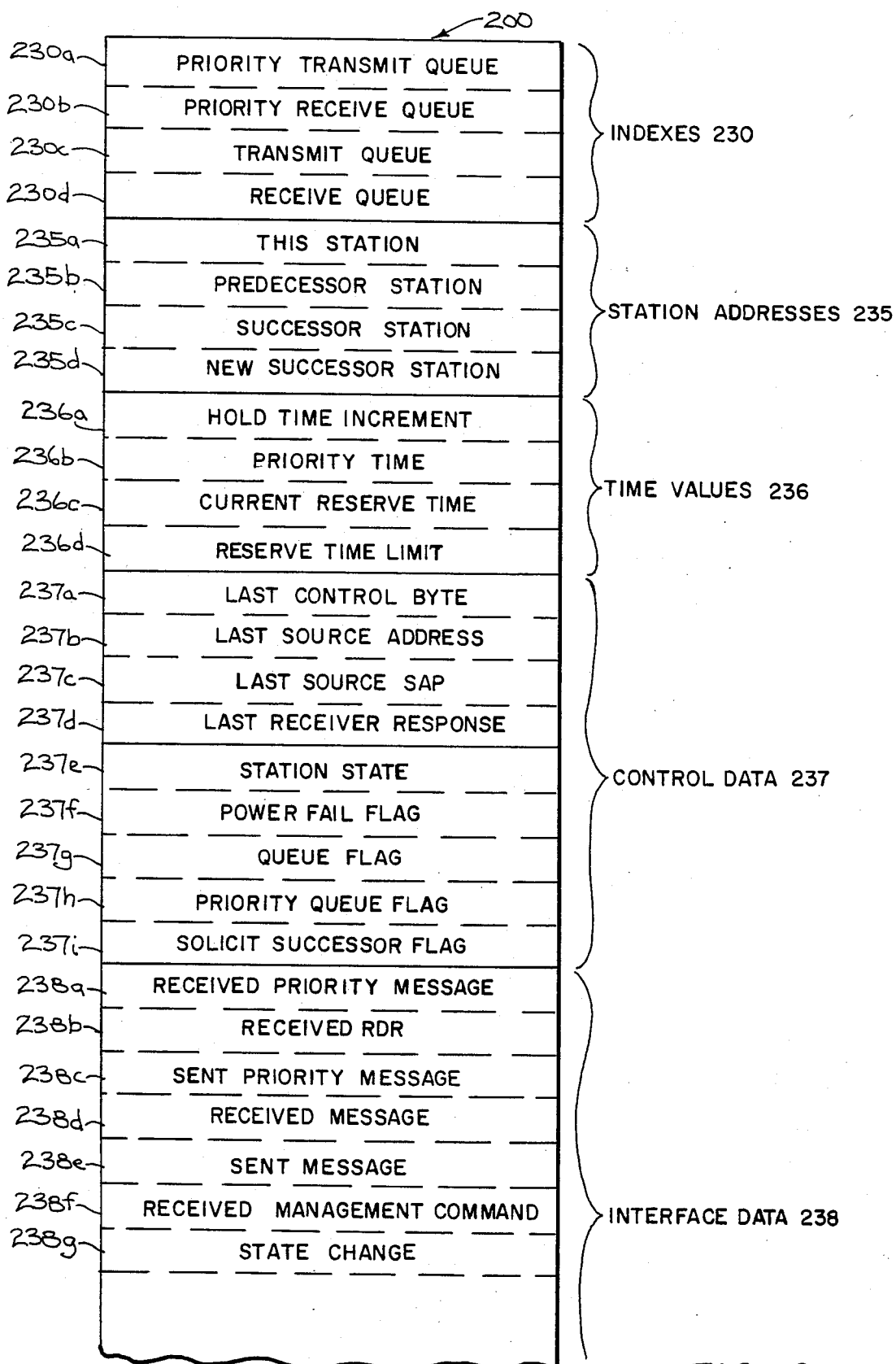
FIG. 6 is a map of the status area which is stored in a memory that forms part of the media access controller of FIG. 2.
Figure 7:
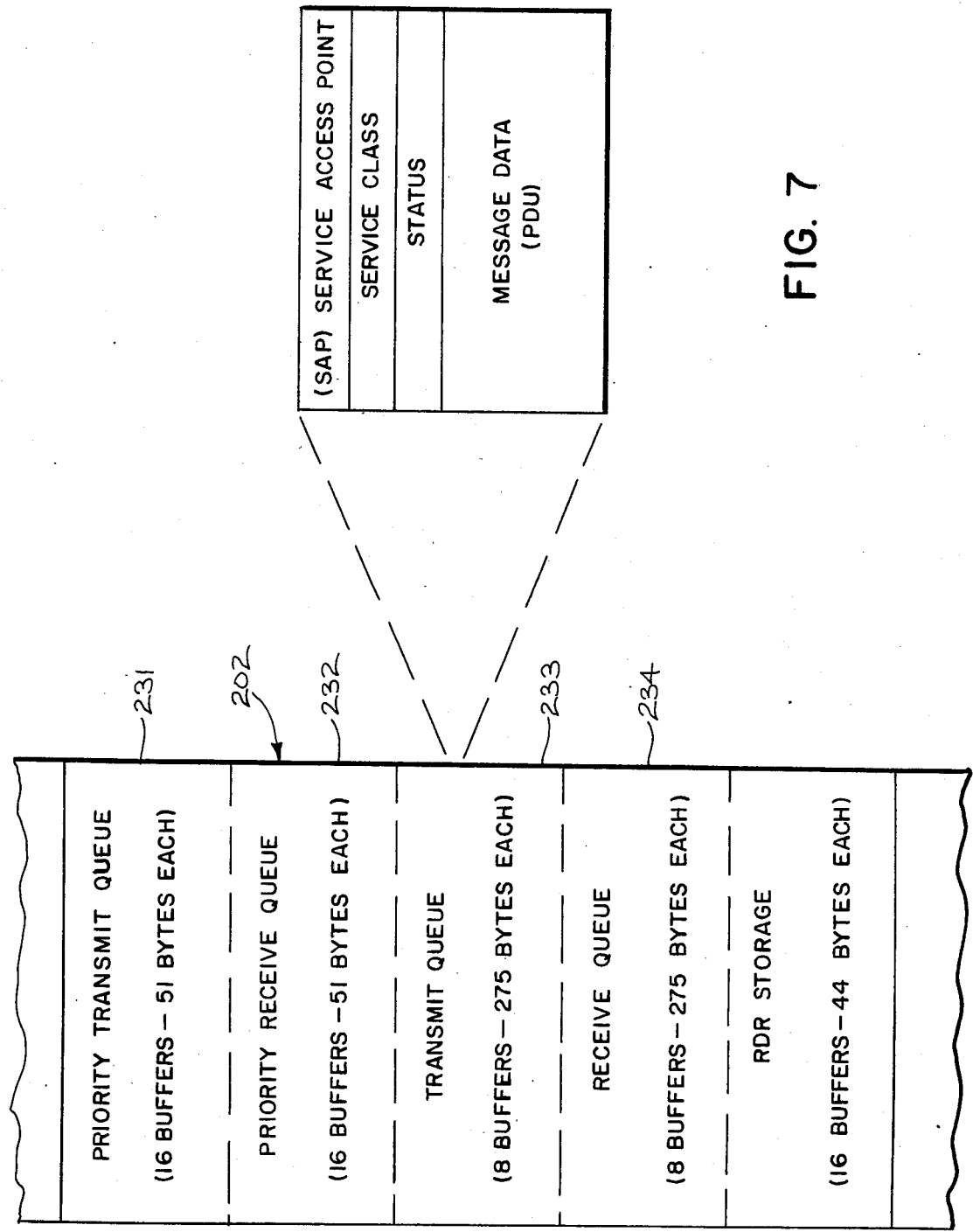
FIG. 7 is a map of the receive and transmit queues which is stored in a memory that forms part of the media access controller of FIG. 2.

Referring particularly to FIGS. 2, 6 and 7, the status area 200 of the RAM 60 contains a number of data structures which are important to the receipt and transmission of messages and which coordinate the operation of the media access controller 5 with the operation of the interface controller 6. These include a set of four indexes 230a–d which point to the next in and next out messages stored in the receive and transmit queues 202. More specifically, the indexes 230a point to the next message in a priority transmit queue 231 which is to be sent by the media access controller 5, and point to the next available space in the queue 231 for the interface controller to store a new priority message. Similar indexes 230b–230d are provided for a priority receive queue 232, a transmit queue 233 and a receive queue 234.

The indexes to the receive queues 232 and 234 point to the next received message which may be read by the interface controller 6, and point to the next available space in which the media access controller 5 can save a received message. The indexes 230 thus operate in combination with the queues 231–234 to pass messages back and forth between the media access controller 5 and the interface controller 6.

Referring particularly to FIG. 6, the status area 200 also includes a set of station addresses 235. These addresses include the address 235a of the station itself, the address 235b of the "predecessor" station on the logical ring, and the address 235c of the "successor" station on the ring. A "new successor" address 235d is also employed during transitions in which the successor address is being changed to accommodate a new station or a withdrawing station.

A set of four timer values 236a–d are also stored in the status area 200. As will be described in more detail below, these time values are employed to determine how long the station can hold the token and whether or not it can send a low priority message.

Also stored in the status area 200 are a number of data structures which are referred to collectively as control data 237a–i. In general, the control data 237 stores information concerning the state of the media access controller 5 as it performs its various functions related to the receipt and transmission of messages.

And finally, the status area 200 includes a set of interface data indicated collectively at 238a–g. This information is written to by the media access controller 5 whenever it sends or receives a message. The media access controller 5 then produces an interrupt request on the control line 71 (FIGS. 2 and 3), and in response, the interface controller 6 executes an interrupt service routine. As will be described in more detail below, the interface controller 6 reads the interface data 238 to determine the reason for the interrupt and acts accordingly.

Description of the Software

As indicated above, the microprocessor 20 in the media access controller 5 executes a program stored in the ROM 23 (FIG. 2) to carry out the "link layer" communications functions. This software controls the sending of messages on the network to ensure that only one station is sending at any time and that all stations have fair access to the network. This software also checks the accuracy of messages which are received and insures that messages are not lost, duplicated or out of sequence. The software is a single threaded state machine routine, with no interrupts.

Figure 8:
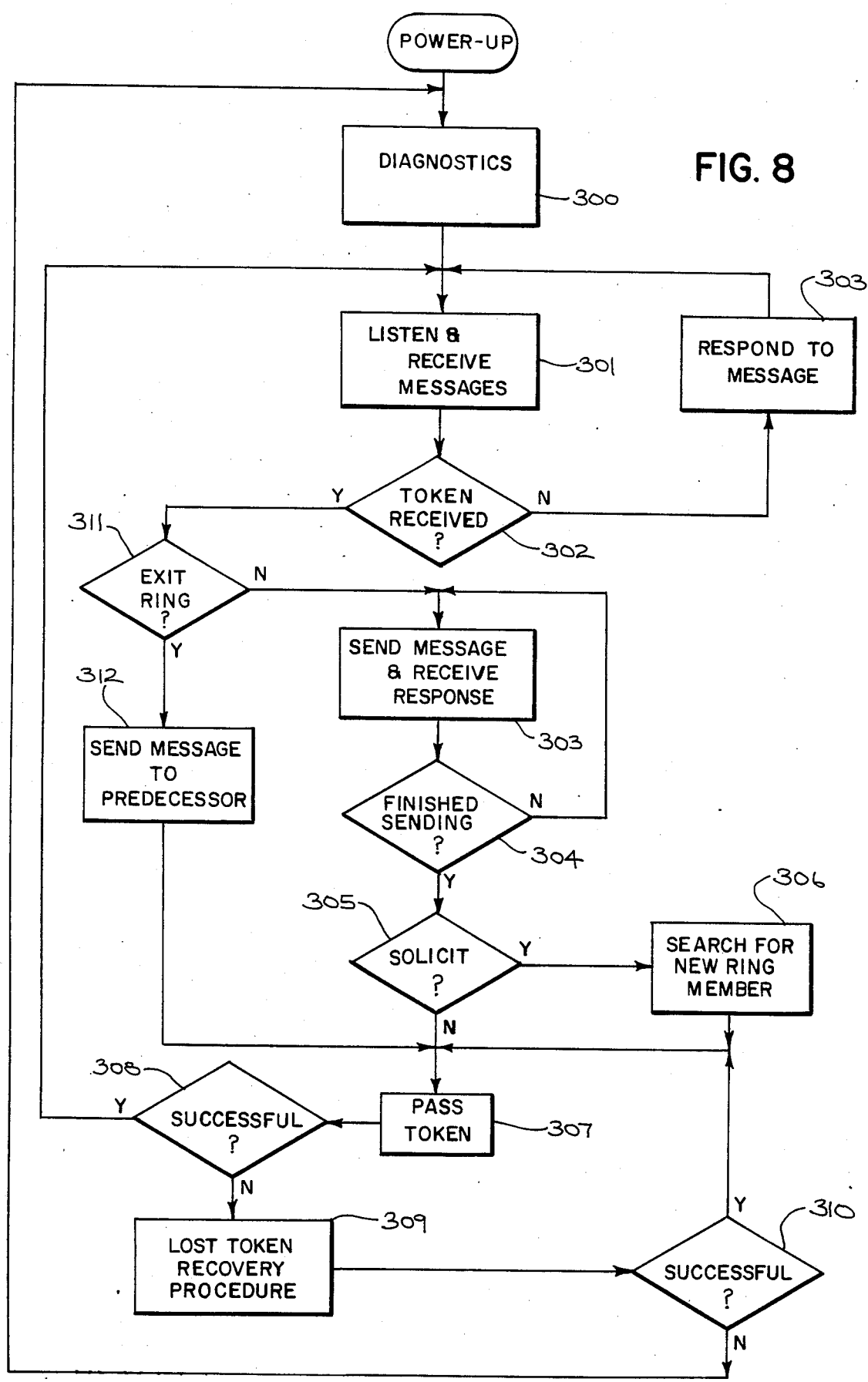
FIG. 8 is a flow chart of the program executed by the media access controller of FIG. 2.

Referring particularly to FIG. 8, the operation of the media access controller 5 is illustrated very generally in flow chart form. When the station powers up a number of diagnostic functions are performed, as indicated by process block 300. These include checking the integrity of the data structures in the RAM 60 and the operation of the controller interface 6. The station then enters a loop in which it listens for messages directed to it. As indicated by process block 301 the messages sent by other stations are received and analyzed to determine if they are directed to this station. If not, the station remains in the listening state. When a message is received, however, it is saved in the receive queue of the RAM 60 in the form shown in FIG. 7. If the received message is not the master token, as determined at decision block 302, the system loops back to listen for further messages after sending a suitable responsive message as indicated at process block 303. The detailed operation of this listening function will be described in more detail below.

When the token is received a test is made at decision block 311 to determine if the station is to exit from the network. This is indicated by the "station state" byte 237e in the dual port RAM 60 (FIG. 6) which is set by the interface controller 6. As will be described in more detail below, when the station is to exit it sends a graceful exit message (type "4") to its predecessor as indicated by process block 312. After receiving an appropriate response, the token is then passed as indicated by process block 307.

When the token is received and the station is to remain in the network, it may send a priority message if one is queued up in the RAM 60. This is performed by instructions represented by process block 303. After sending a message, a check is made at decision block 304 to determine if further messages are available for sending and if the token may be held long enough to send one. If so, the system loops back to send the message and wait for the proper response. Otherwise, the token must be passed.

Before passing the token, however, a check is made of a SOLICIT HEARD flag at decision block 305 to determine if the station is to send a SOLICIT message. If so, the message is sent, as indicated by process block 306, before the token is passed as indicated at process block 307. The sending of messages and the searching for new successors will be described in more detail below.

When the token is passed at process block 307 the station listens for the successor station to accept it. If it does not, as indicated at decision block 308, a recovery procedure is executed at process block 309 to find a successor station. If one is found as determined at decision block 310, the system loops back to pass the token to the new successor station. Otherwise, a fault condition is presumed and the system loops back to process block 300 to perform self diagnostics. In any case, the system again enters the listening state to await receipt of further messages.

Figure 11A:
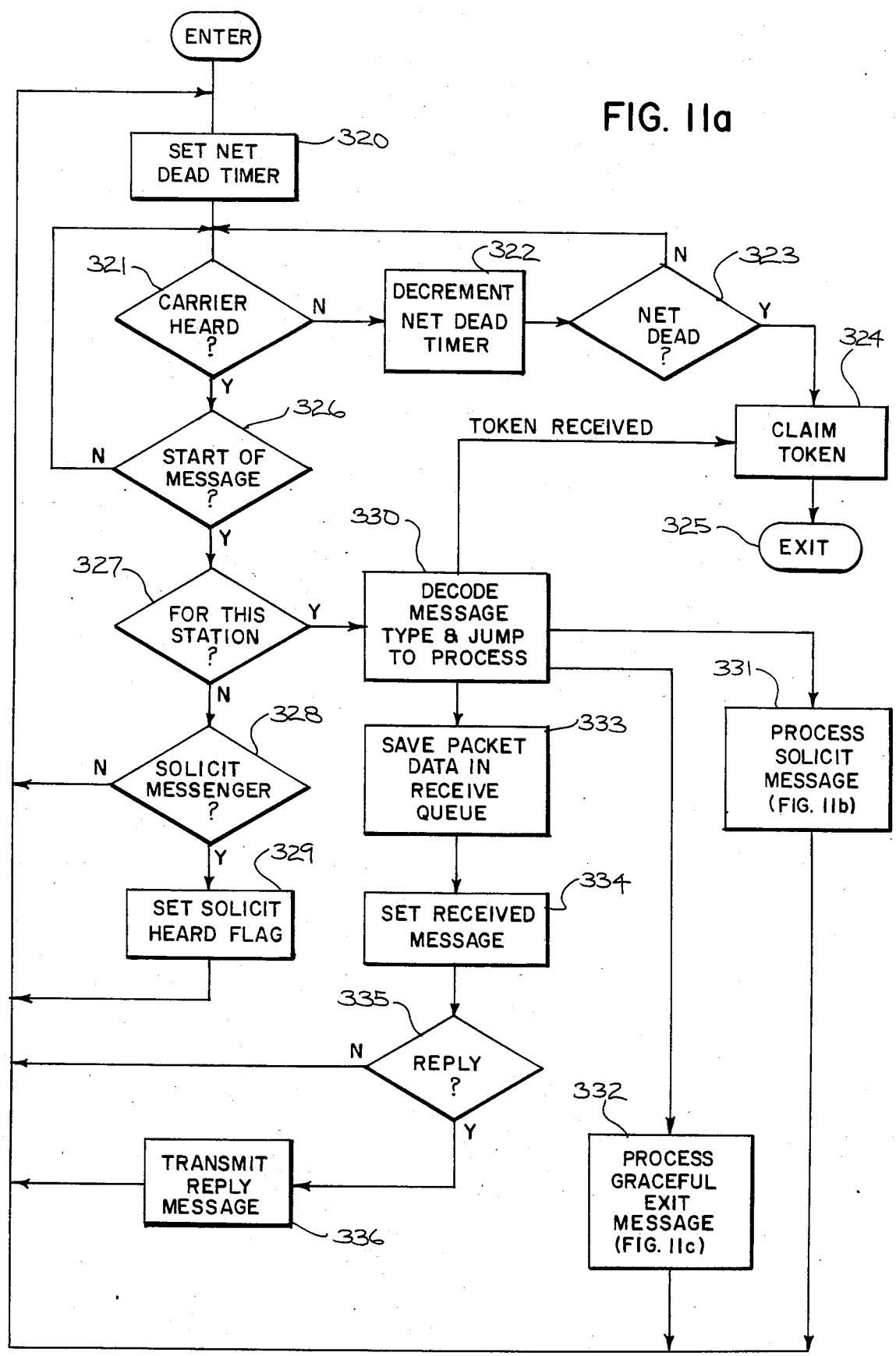

Referring particularly to FIG. 11a, when the station is listening for messages (process block 301 in FIG. 8) a net dead timer is first set at process block 320. A loop is then entered at decision block 321 in which the PCC 40 (FIG. 2) is tested to determine if a carrier signal is present on the network. If not, the net dead timer is decremented at process block 322 and is tested at decision block 323. This loop is maintained until a message is received, or until the net dead timer "times out". When the latter event occurs, the station claims the token at process block 324 and exits at 325.

When a carrier signal is detected at decision block 321, the PCC 40 is tested at decision blocks 326 and 327 to determine if a message is being received and if it is addressed to this station. If it is addressed to another station, the control byte in the message is tested at decision block 328 to determine if it is a SOLICIT message. If not, the system loops back to await another message, otherwise, the SOLICIT HEARD flag is set at process block 329. As indicated above, the SOLICIT HEARD flag is employed to determine when the station has the SOLICIT token and is to send a SOLICIT message before passing the master token.

Referring still to FIG. 11a, when a message is addressed to the station as determined at decision block 327, its control byte is examined at process block 330 to determine the message type. This is accomplished by employing the control byte as an index into a stored jump table which contains the starting address of the program instructions required to process the message. For example, the control byte in a master token message produces a jump to the exit 325, which, as shown in FIG. 8, enables the station to send messages on the network. As will be described in more detail below, a SOLICIT message causes a jump to a process block 331 and a GRACEFUL EXIT message causes a jump to a process block 332. While all of the other message types are separately processed in a similar manner, their processors have been collectively indicated by process block 333 in FIG. 11a.

The packet data in such messages is stored in the receive queue 230b or 230d in the RAM 60, and one of the received message flags 238a, b, d or f is set (FIG. 6) as indicated by process block 334. As described above, this flag signals the interface controller 6 that a message has been received and is awaiting processing. As indicated by decision block 335, the media access controller 5 then loops back to await receipt of another message, unless it must first transmit a reply message, as indicated at process block 336. The reply message may merely be an acknowledge, but it may also include data depending on the type of the received message. For example, and RDR message type requires the sending of data in the reply.

The processing of the SOLICIT and GRACEFUL EXIT messages will now be described in more detail with reference to FIGS. 11b and 11c. It should be noted, however, that when these messages have been processed, the system remains in the listen mode and loops back to the process block 320 in FIG. 11a.

Figure 11B:
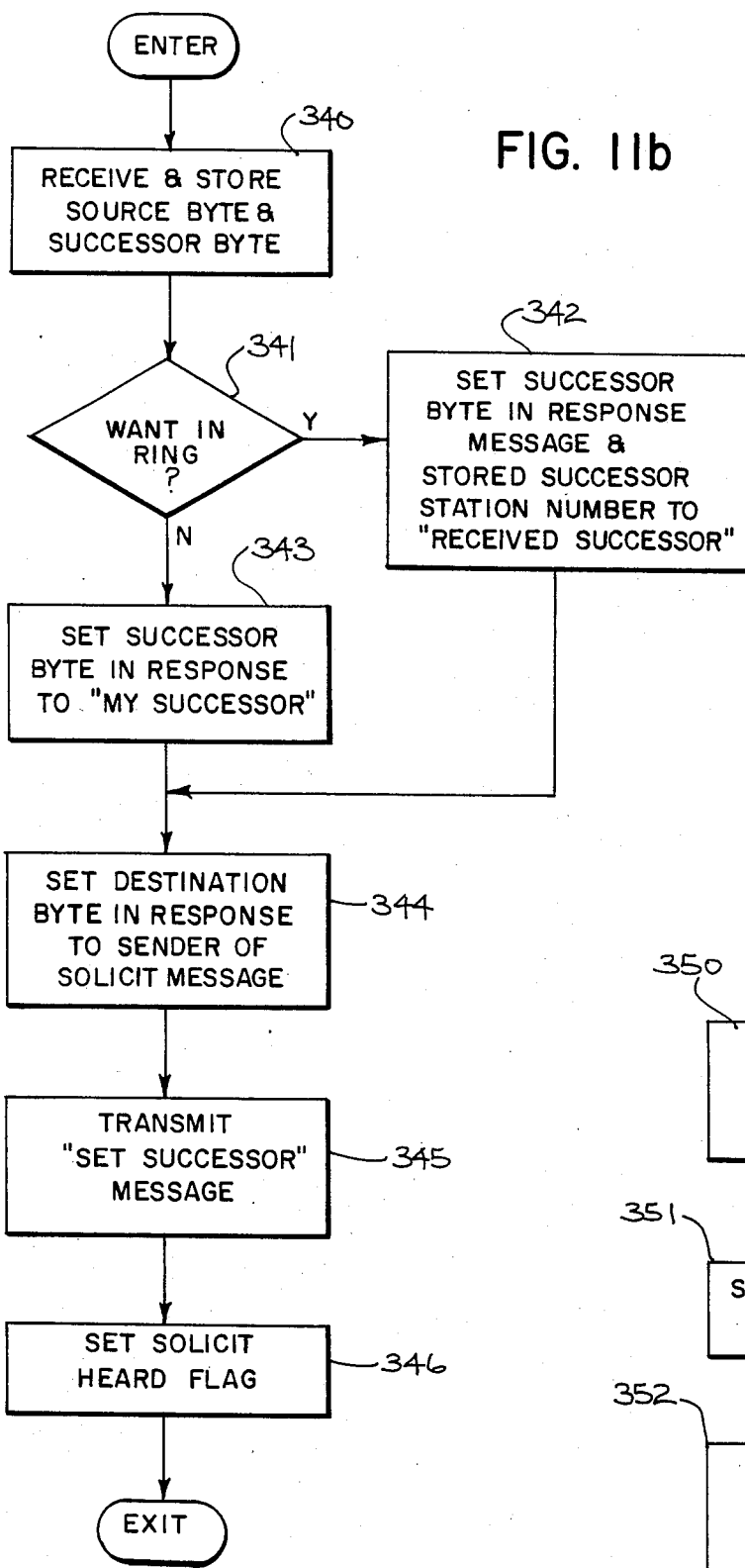

Referring particularly to FIG. 11b, when the SOLICIT message is received by the station, the media access controller 5 saves both the source address of the message and the successor byte contained in the message, as indicated at process block 340. The station state flag 237e (FIG. 6) is then examined at decision block 341 to determine if this station is seeking entry into the ring. If so, a successor byte in the responsive message is set to that which was received in the SOLICIT message as indicated in process block 342. In other words, the successor station number contained in the received SOLICIT message is echoed back to the sending station when this station wants into the logical ring. In addition, the successor station number in the RAM 60 is set to the value of the received successor station number. Otherwise, the current successor station which is stored in the RAM 60 is sent back to the sender of the SOLICIT message as indicated at process block 343. In either case, the destination byte of the responsive message is set to the sender of the SOLICIT message, as indicated at process block 344, and the response is transmitted at process block 345 as a "SET SUCCESSOR" message. The SOLICIT HEARD flag is then set at process block 346 and the system exits and returns to await receipt of further messages.

Figure 11C:
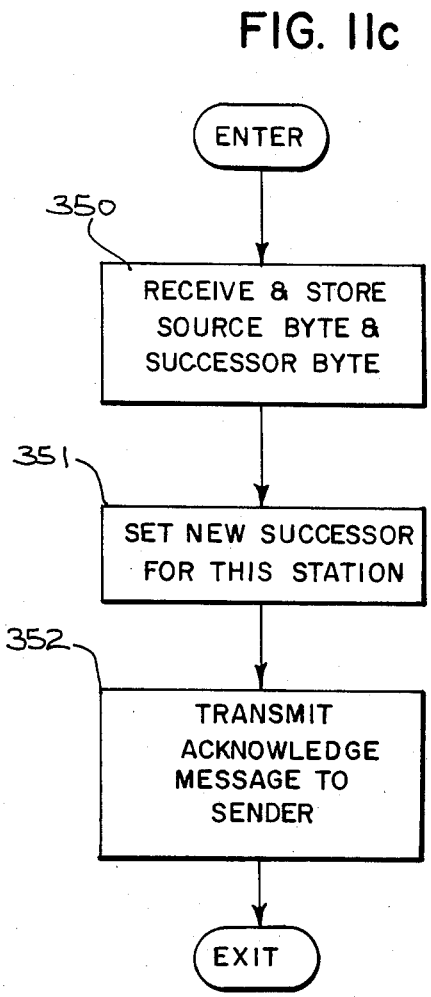

Referring particularly to FIG. 11c, when a GRACEFUL EXIT message is received, both the source byte and the successor byte contained in the message is saved, as indicated at process block 350. The successor station address 235c (FIG. 6) is then set to the new successor value, as indicated at process block 351, and an acknowledge message is transmitted back to the sender, as indicated at process block 352. As a result, when the present station next obtains possession of the master token, it will pass that token on to the new successor station rather than the station which sent the GRACEFUL EXIT message.

Figure 12A:
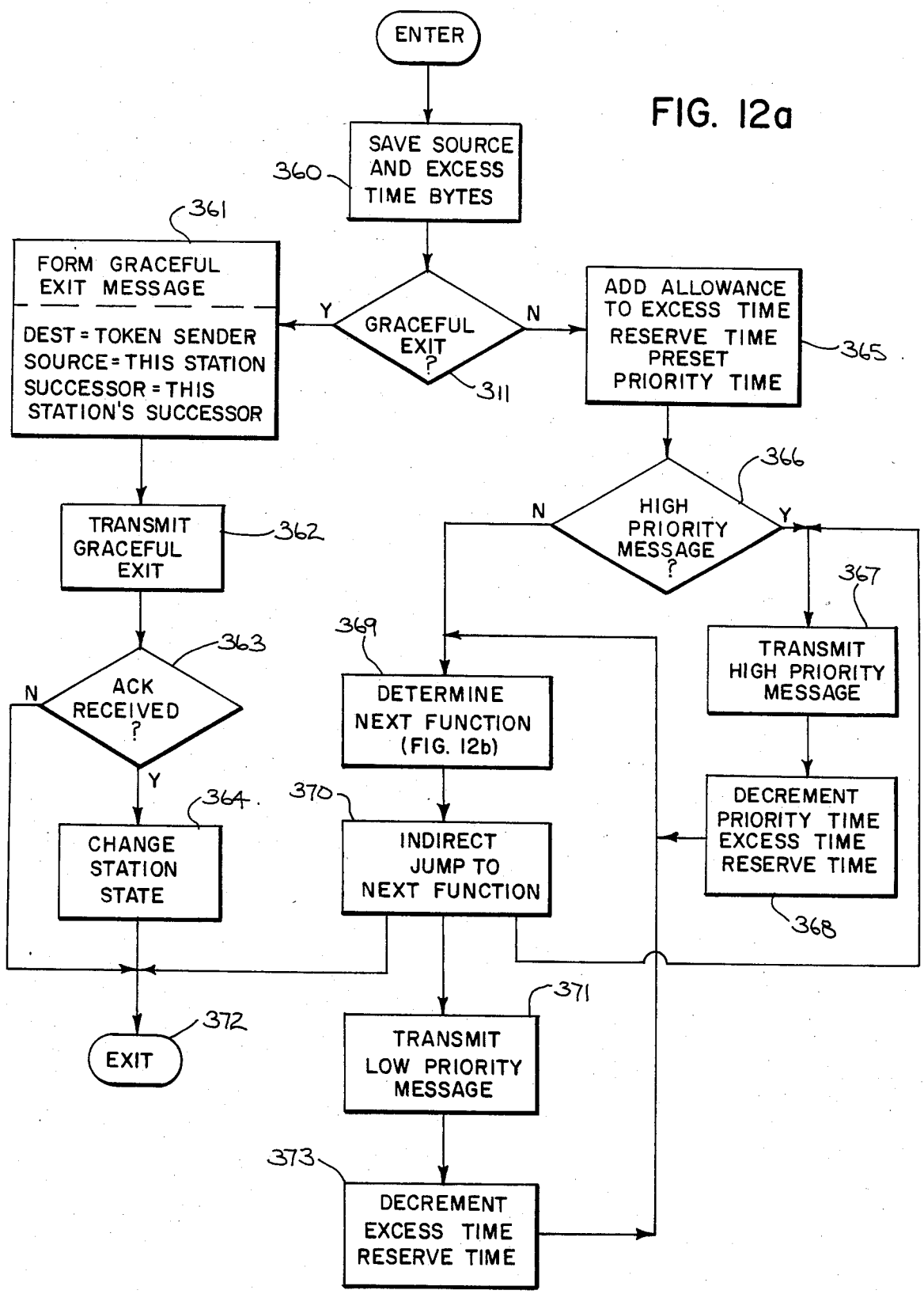
FIG. 12a is a flow chart of the program for sending messages which forms part of the program illustrated in FIG. 8.

Referring particularly to FIGS. 8 and 12a, when the station obtains possession of the master token, it may originate messages itself. As indicated by process block 360, the source of the token is saved as well as the "EXCESS TIME" bytes. The test is then made at decision block 311 as to whether a graceful exit is to be made from the ring. If so, a graceful exit message is formed at process block 361. This message informs the station which sent the master token (i.e. predecessor station) that the present station wants out of the ring. This station's successor is sent in the message, and as described above, the predecessor uses it to set its own successor. The message is sent as indicated at process block 362, and the acknowledgment message is then awaited. If a proper acknowledgment is not received, as determined at decision block 363, the routine is exited to pass the master token on to the next station in the ring. Otherwise, the state of the present station is changed at 364 before the token is passed. This state change is accomplished by altering the station state byte 237e in the RAM 60.

Referring particularly to FIG. 12a if a graceful exit is not indicated, other messages may be sent by the station as long as it possesses the master token. But first, as indicated at process block 365, the EXCESS TIME and RESERVE TIME are updated by adding preset amounts to them as follows:

EXCESS=EXCESS+HOLD TIME INCREMENT

RESERVE=RESERVE+HOLD TIME INCREMENT

A PRIORITY TIME is also preset to the HOLD TIME INCREMENT, WHERE:

HOLD TIME INCREMENT=1.1 (maximum time needed to send one high priority message).

If there are any high priority messages awaiting transmission, the system branches at decision block 366 and the message is transmitted as indicated at process block 367. The EXCESS and RESERVE times are then decremented by the actual time needed to send the message as indicated at process block 368. In addition, the PRIORITY TIME is decremented from its initial value.

The system then flows to a process block 369 which determines the next function to be performed. As will be explained in detail below, the instructions in this block 369 determine if any high or low priority messages are waiting to be sent and if there is sufficient time alloted to transmit them. Depending on the outcome of these tests, the system then jumps to perform the next function as indicated at process block 370. Such functions include: transmission of another high priority message at process block 367; transmission of a low priority message at process block 371; or exit the routine at 372 to pass the master token. If a low priority message is transmitted at process block 371, the EXCESS and RESERVE times are decremented at process block 373 by the amount of time actually required to send the low priority message. The system then loops back to process block 369 to determine what function should be performed next.

Each media access controller 5 controls the time it holds the master token such that it observes a token rotation time that is less than or equal to a system defined maximum. Such a deterministic maximum time is required for the control of real time devices in an industrial environment. This maximum time is a linear function of the number of stations in the ring.

High priority traffic is guaranteed up to 90% of the available network bandwidth and will supersede all low priority traffic up to this limit. Low priority traffic receives 10% of the available bandwidth, and may take up to 100% if no high priority traffic is present.

To accomplish these objectives the token hold time of each station is limited so that the token rotates around the ring on a schedule. The schedule is based on the time it requires each station to send one high priority message of maximum length plus ten percent of that time. When no low priority messages are sent, the master token rotates around the ring faster than required to meet this schedule, even if each station sends a high priority message. The EXCESS time variable which is carried by the master token provides an indication of how far ahead of schedule the token is at any point in time. The EXCESS time is limited to a maximum value equal to the time required to send one maximum length, low priority message.

The EXCESS time must accumulate before a low priority message may be sent by any station. To prevent a single station from always using up this EXCESS time, and to insure a fair distribution of EXCESS time, each station maintains a record of its own contribution to the EXCESS time. This is the RESERVE time which is stored in the RAM 60. Only when a station has accumulated a RESERVE time greater than the time needed to send a low priority message may it send that message.

Figure 12B:
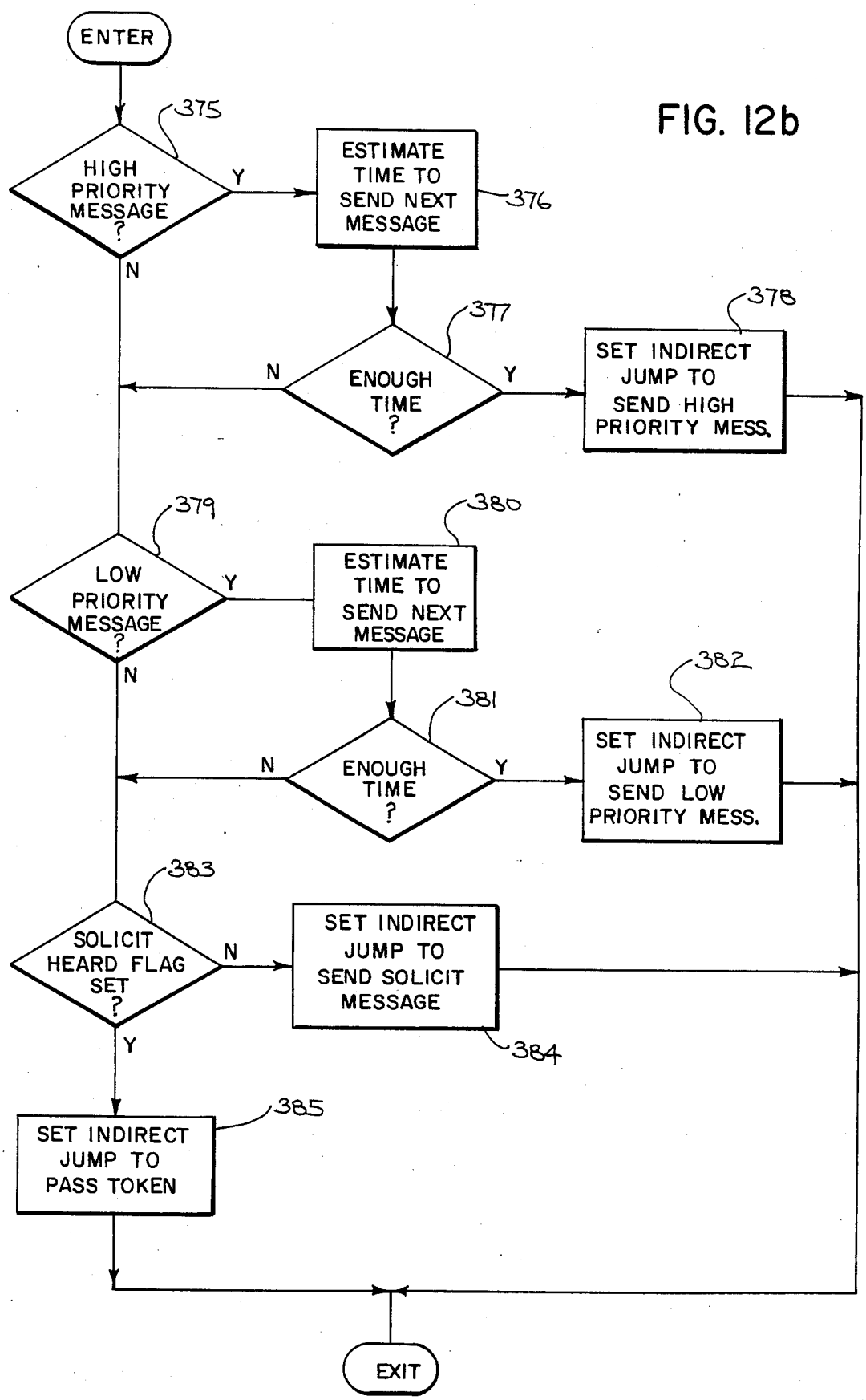

Referring particularly to FIG. 12b, the transmit queues and the values of the various timers are examined to determine if further high priority or low priority messages are to be sent. More specifically, the index 230a into the high priority queue 231 is examined at decision block 375 to determine if a message is to be sent. If so, the time required to send the message is estimated at process block 376. This estimate is based on the type and size of the message. As indicated at decision block 377, this estimated time is compared to the PRIORITY TIME that is maintained in the RAM 60. If sufficient PRIORITY TIME is available, the system branches to process block 378 which sets up an indirect jump to the process block 367 (FIG. 12a). Another high priority message is thus subsequently transmitted.

If a low priority message awaits transmission, the system branches at decision block 379. The time required to send the message is estimated at process block 380 and then a determination is made at decision block 381 as to whether there is sufficient time available. The low priority message is sent if the estimated time is less than or equal to the EXCESS TIME and is less than or equal to the RESERVED TIME. If this is the case, then the indirect jump to process block 371 (FIG. 12a) is set up at process block 382.

If no messages are to be sent, or there is insufficient time to do so, the SOLICIT HEARD flag is checked at decision block 383. If this flag has not been set since the station last possessed the master token, it indicates that it is the station's turn to solicit a successor. Accordingly, the indirect jump is set at process block 384 to send a solicit message as will be described in detail below. If the station does not have the SOLICIT token, then the system is set to immediately pass the master token as indicated at process block 385.

Figure 13:
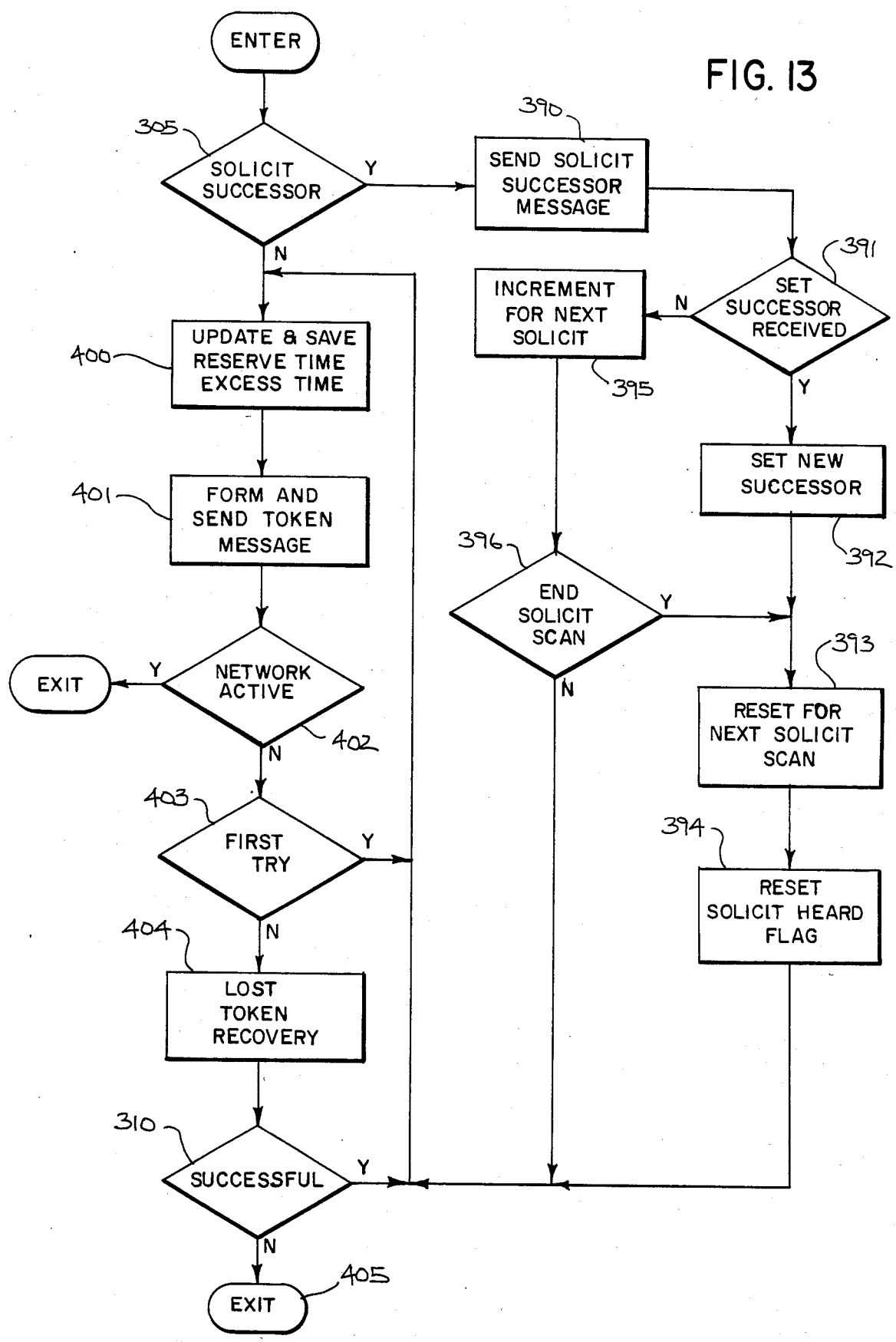
FIG. 13 is a flow chart of the program for soliciting successors and passing the master token which forms part of the program of FIG. 8.

Referring particularly to FIGS. 8 and 13, when the station has completed sending messages the master token is passed to its successor. But first, as indicted at decision block 305, the SOLICIT HEARD flag is checked to determine if the station has the virtual SOLICIT token. If this flag has not been set, the system branches to process block 390 to send a solicit successor message. This message contains a DESTINATION station number which ranges between that of the present station and that of the present station's current successor. This message also contains the present station's current successor, and the present station number is the indicated SOURCE of this message. The station will keep the virtual SOLICIT token until it has scanned all of the station numbers between it and its current successor. Only one solicit successor message is sent each time the master token travels around the ring back to this station.

As indicated by process block 391, if a set successor message is received back in response to the sending of the solicit successor message, the SUCCESSOR STATION address 235c in the RAM 60 (FIG. 6) is set as indicated at process block 392. The counter, NEW SUCCESSOR STATION 235d used to generate the destination address in the solicit successor messages is then reset at process block 393. It is reset to a value which is one greater than the current station's station number. The SOLICIT HEARD flag is then reset at process block 394 to effectively pass the virtual SOLICIT token to the next station in the ring.

If no response is received as a result of the solicit successor message, the system branches at decision block 391. The NEW SUCCESSOR STATION counter is then incremented at process block 395 such that the next higher station number will be solicited during the next possession of the master token. However, as indicated at decision block 396, if this counter reaches the station number of the current successor, the scan is complete and no new successor has been found. When this occurs the system branches to process block 393 to prepare for the next scan and to pass the virtual SOLICIT token. Otherwise, the system loops to pass the master token and to await its return so that another station number may be solicited.

Referring still to FIG. 13, before the master token is passed to the successor station, the RESERVE and EXCESS times are updated to reflect any additional token holding time. This is accomplished at process block 400, and as explained above, the RESERVE time is stored in the RAM 60 and the EXCESS time is sent with the master token. The token message is formed at process block 401 using this EXCESS time, and the following:

SOURCE=THIS STATION
DESTINATION=SUCCESSOR STATION

This token message is transmitted and the media access controller 5 then listens for activity on the network which indicates that the token has successfully been passed. If this does not occur within a preset time interval, the system branches at decision block 402. If this was the first attempt to pass the master token as determined at decision block 403, the system loops back to process block 400 to try again. Otherwise, a lost token process is carried out as indicated at process block 404. This process involves the sending of a "WHO FOLLOWS" message and a resulting SET SUCCESSOR message which indicates to the present station its new successor. If this occurs successfully, as determined at decision block 310, the system loops to send the master token to the new successor station. Otherwise, the routine exits at 405 to the diagnostics process block 300 (FIG. 8).

The communications network of the present invention is particularly well suited to the passing of information between real time control systems found in an industrial environment. Stations with their associated controls are smoothly added to or dropped from the communications ring. While two classes of messages may be sent on the network, the high priority messages commonly used for real time control information will under no circumstances completely choke off the low priority messages commonly used for management information.

| Component Appendix | |
|---|---|
| Component | Description |
| Microprocessor 20 | 68008 microprocessor manufactured by Motorola. |
| Decoder circuit 25 | 20L8A PAL manufactured by Monolithic Memories, Inc. |
| Protocol communication controller 40 | R68560 multi-protocol communications controller manufactured by Rockwell International Corp. |
| Manchester encoder/decoder 46 | HD-6409 Manchester encoder-decoder manufactured by Harris Corp. |
| Receive and transmit modems 47 and 45 | NE5080 and NE5081 high speed FSK modem manufactured by Signetics Inc. |
| Output latch 70 | Two 74LS259 addressable latches manufactured by Texas Instruments, Inc. |
| Input buffer 75 | Two 74ALS465 octal buffers manufactured by Texas Instruments, Inc. |
| RAM 60 | 6264 random access memory (8Kx8) manufactured by Intel. |
| ROM 23 | 27128 UVPROM manufactured by Intel Inc. |
| Delay 44 | PAL16R6 programmable array logic manufactured by Monolithic Memories, Inc. |
| Address gates 62 | Two 74ALS541 octal buffers manufactured by Texas Instruments. |
| Address gates 65 | Two 74LS244 octal buffers manufactured by Texas Instruments. |

| -continued | |
|---|---|
| Component Appendix | |
| Component | Description |
| Data gates 61 and 64 | Two 74ALS245 octal bus transceivers manufactured by Texas Instruments. |
| Microprocessor 80 | 68000 microprocessor manufactured by Motorola. |
| Timer/priority encoder 95 | 68901 peripheral interface manufactured by Motorola. |
| DUART 85 | 68681 Dual universal asynchronous receiver/transmitter manufactured by Motorola. |
| 3-to-8 decoder 91 | |
| RAM 105 | Sixteen 6664 dynamic RAM (64Kx1) manufactured by Intel. |
| ROM 81 | Eight 27256 PROMs (32Kx8) manufactured by Intel. |
| Output latch 110 | Two 8-bit addressable latches SN74LS259 manufactured by Texas Instruments. |
| Input gates 107, 108, 120 | Octal buffers and line drivers SN74ALS541 manufactured by Texas Instruments. |
| Output latch 111 | Octal D-type latch SN74LS373 manufactured by Intel. |
| Flip-flops 150-153, 169, 171 | D-type edge-triggered flip-flop SN74ALS74 manufactured by Texas Instruments. |

We claim:
1. A method of communicating over a network formed by a plurality of stations interconnected by a communications media, comprising the steps of:
   (a) passing a master token to each of a plurality of the stations in a predetermined order;
   (b) enabling each station to send a message on the network when it has possession of the master token;
   (c) enabling each station having possession of the master token to send a graceful exit message to the station from which it received the master token, said graceful exit message indicating that the sending station is no longer to receive the master token; and
   (d) enabling each station which receives a graceful exit message to alter the predetermined order in which the master token is passed such that the station sending the graceful exit message does not receive the master token.

2. The method as recited in claim 1 in which each station stores a successor station number which indicates the station to which it is to pass the master token, in which the graceful exit message includes the successor station number stored by the station sending the graceful exit message, and in which the station receiving the graceful exit message alters the predetermined order by changing its stored successor station number to the successor station number received in the graceful exit message.

3. The method as recited in claim 1 in which each station stores a predecessor station number which indicates the station number from which it receives the master token, and in which the graceful exit message is sent to the station indicated by the stored predecessor station number.

4. A method of communicating over a network formed by a plurality of stations interconnected by a communications media, comprising the steps of:
   (a) passing a master token to each of a plurality of the stations in a predetermined order;

(b) enabling each station to send a message on the network when it has possession of the master token;

(c) successively passing a solicit token to each of said plurality of the stations in a predetermined order;

(d) enabling each station to send a solicit message on the network when it has possession of both the solicit token and the master token, said solicit message being directed to a recipient station interconnected to the connunications media, but not one of said plurality of stations receiving the master token;

(e) enabling each recipient station which receives a solicit message to become one of said plurality of stations receiving the master token and the solicit token.

5. The method as recited in claim 4 in which each recipient station receiving the solicit message becomes one of said plurality of stations receiving the master token by:

sending a set successor message back to the station which sent the recipient station the solicit message, said set successor message indicating that the master token is to be passed to the recipient station by the station which receives the set successor message.

6. The method as recited in claim 5 in which each station stores a successor station number which indicates the station to which it is to pass the master token, in which the solicit message includes the successor station number stored at the station which originated the solicit message, and in which each station receiving the solicit message stores the successor station number contained in the solicit message as its own successor station number.

7. The method as recited in claim 4 in which each station stores a station number and a successor station number that indicates the station to which it is to pass the master token, and in which each station having the solicit token sends a solicit message to each of the stations having station numbers between the stored station number and the stored successor station number.

8. A method of communicating over a network formed by a plurality of stations interconnected by a communications media, comprising the steps of:

(a) passing a master token to each of a plurality of the stations in a predetermined order, said master token including an excess time variable;

(b) enabling each station to send a first message on the network when it has possession of the master token;

(c) incrementing the excess time variable carried with the master token by a preset amount each time it is passed to another station;

(d) decrementing the excess time variable carried with the master token by the amount of time required for the station holding the master token to send a message; and (e) inhibiting the station holding the master token from sending further messages when the excess time variable is less than the time required to send any such further messages.

9. The method as recited in claim 8 in which the preset amount by which the excess time variable is incremented each time it is passed to another station is greater than the maximum time required to send said first message.

10. The method as recited in claim 9 in which said first message is a high priority message;

(f) storing at each station a reserve time variable which is incremented by said preset amount each time the station receives the master token and which is decremented by the amount of time required for the station to send its messages;

(g) sending a low priority message when the time required to send the low priority message is less than the excess time variable and is less than the reserve time variable stored by the station sending the low priority message.

11. A station for a communications network having a plurality of such stations interconnected by a communications media, the combination comprising;

sending means for sending a message on the network;

receiver means for receiving a message from the network;

detector means coupled to the receiver means for determining the type of message which is received;

memory means for storing data indicative of the desired state of the station; and means coupled to the detector means, the memory means, and the sending means for forming and sending a graceful exit message when the station receives a master token message from another station on the network, and the state data stored in the memory means indicates that the station is no longer to receive the master token message from another station.

12. The station as recited in claim 11 which includes successor station storage means for storing the identity of yet another station on the network to which the station sends master token messages, and in which the graceful exit message forming means couples to the successor station storage means and the graceful exit message includes data indicative of the successor station identity.

13. The station as recited in claim 12 which includes means coupled to the detector means and the successor station storage means for altering the identity of said yet another station when a graceful exit message is received.

14. A station for a communications network having a plurality of such stations interconnected by a communications media, the combination comprising:

sending means for sending a message on the network;

receiver means for receiving a message from the network;

detector means coupled to the receiver means for determining the type of message which is received;

successor station storage means for storing the identity of another station on the network to which the station sends master token messages; and means coupled to the detector means and the sending means for forming and sending a solicit message when the station receives a message which indicates that the station has a solicit token, said solicit message being directed to yet another station on the network for the purpose of determining if said yet another station wants to establish communications on the network.

15. The station as recited in claim 14, which includes means coupled to the detector means and the successor station storage means for altering the stored identity of the successor station when a set successor message is received from yet another station to which the solicit message was sent.

16. A station for a communications network having a plurality of such stations interconnected by a communications media, the combination comprising:

sending means for sending a message on the network;

receiver means for receiving a message from the network;

detector means coupled to the receiver means for determining the type of message which is received;

a transmit message queue for storing messages to be sent on the network;

storage means coupled to the receiver means and responsive to the receipt of a master token message for storing an excess time variable which forms part of the master token message;

means for incrementing the stored excess time variable by a preset amount;

estimating means for determining the time required to send a selected message in the transmit message queue;

comparator means for comparing the time required to send the selected message with the excess time variable and enabling the sending means to send the selected message on the network if there is sufficient excess time;

means for decrementing the stored excess time variable by the time required to send the selected message; and means for enabling the sending means to send a master token message to another station on the network, which master token message includes the value of the stored excess time variable.

17. The station as recited in claim 16 which includes a low priority transmit message queue;

reserve time storage means which is incremented by a preset amount each time a master token message is received by the station;

means for decrementing the stored reserve time by an amount equal to the time required to send messages from the transmit message queue or from the low priority transmit message queue;

second estimating means for determining the time required to send a second selected message in the low priority transmit message queue; and second comparator means for comparing the time required to send the second selected message with the stored reserve time and enabling the sending means to send the second selected message on the network if there is sufficient excess time.

* * * * *

UNITED STATES PATENT AND TRADEMARK OFFICE
CERTIFICATE OF CORRECTION

PATENT NO. : 4,667,323

DATED : May 19, 1987

INVENTOR(S) : Engdahl et al.

It is certified that error appears in the above-identified patent and that said Letters Patent is hereby corrected as shown below:

```
Column 10, line 2, before "two sets" delete -- a --.

Column 15, line 49, "For example, and" should
be -- For example, an --.

Column 18, line 25, "indicted" should be -- indicated --.

Column 21, line 10, "connunications" should be
-- communications --.

Column 21, line 47, in claim 8, after "including"
insert -- data which represents the value of --.
```

Signed and Sealed this

Eighth Day of December, 1987

Attest:

DONALD J. QUIGG

*Attesting Officer*        *Commissioner of Patents and Trademarks*